(12) United States Patent
Kwon et al.

(10) Patent No.: US 8,667,403 B2
(45) Date of Patent: Mar. 4, 2014

(54) MOBILE TERMINAL AND GROUP CHAT CONTROLLING METHOD THEREOF

(75) Inventors: Yeaeun Kwon, Yongin-si (KR);
Yongmun Gong, Anyang-si (KR);
Wonyong Suh, Seoul (KR); Suhjin Yi, Seongnam-si (KR); Sungmin Sohn, Anyang-si (KR); Yunghee Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 12/824,870

(22) Filed: Jun. 28, 2010

(65) Prior Publication Data

US 2011/0296320 A1    Dec. 1, 2011

(30) Foreign Application Priority Data

May 31, 2010  (KR) .................. 10-2010-0050917

(51) Int. Cl.
*G06F 3/00* (2006.01)

(52) U.S. Cl.
USPC ........... 715/758; 715/752; 715/753; 709/206; 709/207; 379/88.17

(58) Field of Classification Search
USPC .................. 715/758, 752, 753; 379/88.17
See application file for complete search history.

(56) References Cited

U.S. PATENT DOCUMENTS

| | | | |
|---|---|---|---|
| 6,564,244 B1 | 5/2003 | Ito et al. | |
| 6,898,631 B1 * | 5/2005 | Kraft et al. | 709/224 |
| 6,915,138 B2 * | 7/2005 | Kraft | 455/466 |
| 6,983,305 B2 * | 1/2006 | Danker et al. | 709/204 |
| 7,111,044 B2 * | 9/2006 | Lee | 709/204 |
| 7,283,805 B2 * | 10/2007 | Agrawal | 455/412.2 |
| 7,725,542 B2 * | 5/2010 | Daniell et al. | 709/206 |
| 7,747,706 B2 * | 6/2010 | Ran | 709/219 |
| 7,756,936 B2 * | 7/2010 | Rosenberg et al. | 709/206 |
| 7,917,589 B2 * | 3/2011 | Kronlund et al. | 709/206 |

(Continued)

FOREIGN PATENT DOCUMENTS

| | | |
|---|---|---|
| CN | 101159705 A | 4/2008 |
| CN | 101188578 A | 5/2008 |

(Continued)

OTHER PUBLICATIONS

Yahoo Messenger "Yahoo", http://help.yahoo.com/sbc/tutorial/cg/cg_chat5.html, Nov. 21, 2008, pp. 1-3.*

(Continued)

*Primary Examiner* — Stephen Hong
*Assistant Examiner* — Mario M Velez-Lopez
(74) *Attorney, Agent, or Firm* — Birch, Stewart, Kolasch & Birch, LLP

(57) ABSTRACT

A mobile terminal and group chat controlling method thereof are disclosed, by which a chat content transceived in an performed group chat after a join-impossible state can be received in the course of performing the group chat if impossible to join the group chat. The present invention includes performing a group chat with a plurality of counterparts, displaying a chat window of the performed group chat, if the mobile terminal is impossible to join the group chat (i.e., if the mobile terminal enters a join-impossible state) in the course of performing the group chat, receiving chat contents transceived among a plurality of the counterparts in the performed group chat after the join-impossible state, and displaying the received chat contents.

16 Claims, 25 Drawing Sheets

(56) References Cited

U.S. PATENT DOCUMENTS

| | | | |
|---|---|---|---|
| 7,945,620 B2* | 5/2011 | Bou-Ghannam et al. | 709/204 |
| 8,055,710 B2* | 11/2011 | Shook et al. | 709/204 |
| 2003/0233413 A1 | 12/2003 | Becker | |
| 2004/0015548 A1* | 1/2004 | Lee | 709/204 |
| 2004/0078444 A1* | 4/2004 | Malik | 709/206 |
| 2006/0075039 A1* | 4/2006 | Narayanaswami et al. | 709/206 |
| 2006/0209798 A1* | 9/2006 | Oikarinen et al. | 370/352 |
| 2007/0232284 A1* | 10/2007 | Mason et al. | 455/416 |
| 2008/0034060 A1* | 2/2008 | Fisher | 709/218 |
| 2008/0080679 A1* | 4/2008 | Fernandez et al. | 379/88.17 |
| 2008/0235361 A1* | 9/2008 | Crosbie et al. | 709/223 |
| 2009/0177601 A1* | 7/2009 | Huang et al. | 706/16 |
| 2009/0305632 A1* | 12/2009 | Sarkissian et al. | 455/41.2 |

FOREIGN PATENT DOCUMENTS

| | | |
|---|---|---|
| CN | 101622640 A | 1/2010 |
| EP | 1 257 144 A2 | 11/2002 |
| EP | 2 093 946 A1 | 8/2009 |
| WO | WO 2008/103855 A1 | 8/2008 |

OTHER PUBLICATIONS

Yahoo Messenger Offline messages "Yahoo Offline", http://answers.yahoo.com/question/index?qid=20070925095846AAgVEJJ, Sep. 25, 2007, pp. 1-2.*

Yahoo Messenger for Vista "YahooVista", http://www.ymessengerblog.com/blog/2008/01/22/yahoo-messenger-for-vista-refresh/, Jan. 22, 2008, pp. 1-2.*

"Yahoo! Messenger for Vista Refresh", Yahoo! Messenger Blog, www.ymessengerblog.com/blog/2008/01/22/yahoo-messenger-for-vista-refresh/, Jan. 22, 2008, pp. 1-2.

* cited by examiner (a)

(b)

MOBILE TERMINAL AND GROUP CHAT CONTROLLING METHOD THEREOF

Pursuant to 35 U.S.C. §119(a), this application claims the benefit of earlier filing date and right of priority to Korean Application No. 10-2010-0050917, filed on May 31, 2010, the contents of which are hereby incorporated by reference herein in their entirety.

BACKGROUND OF THE INVENTION

1. Field of the Invention

The present invention relates to a mobile terminal, and more particularly, to a mobile terminal and group chat controlling method thereof. Although the present invention is suitable for a wide scope of applications, it is particularly suitable for controlling a group chat in a mobile terminal.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

However, in a mobile terminal according to a related art, in case of withdrawing from a group chat in the course of performing the group chatting (e.g., a case of withdrawing from a group chat only, a case of logging out from a communication service for performing a group chat), there is no way to re-enter the withdrawn group chat unless a chatter remaining in the group chat makes an invitation to the group chatting.

Moreover, once a mobile terminal withdraws from a group chat, it is unable to provide a subsequent chat content transceived in the course of the group chat after the withdrawal to a chatter having withdrawn from the group chat.

SUMMARY OF THE INVENTION

Accordingly, the present invention is directed to a mobile terminal and group chat controlling method thereof that substantially obviate one or more problems due to limitations and disadvantages of the related art.

An object of the present invention is to provide a mobile terminal and group chatting controlling method thereof. In particular, if a chatter becomes impossible to keep joining a group chat in the course of performing the group chat, a subsequent chat content can be provided.

Another object of the present invention is to provide a mobile terminal and group chatting controlling method thereof. In particular, if a specific counterpart in the course of performing a group chat becomes impossible to keep joining the group chat, a subsequent chat content can be provided to the specific counterpart.

A further object of the present invention is to provide a mobile terminal and group chatting controlling method thereof. In particular, if a mobile terminal becomes impossible to keep joining a group chat in the course of performing the group chat, it is able to rejoin a previous group chat in case of entering a group chat available mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit configured to perform a group chat with a plurality of counterparts, a display unit configured to display a chat window of the performed group chat, and a controller determining whether the mobile terminal is impossible to join the group chat (i.e., whether the mobile terminal enters a join-impossible state) in the course of performing the group chat, the controller controlling the wireless communication unit to receive chat contents transceived among a plurality of the counterparts in the performed group chat after the join-impossible state in case of the join-impossible state, the controller controlling the display unit to display the received chat contents.

In another aspect of the present invention, a mobile terminal includes a wireless communication unit configured to perform a group chat with a plurality of counterparts, a display unit configured to display a chat window of the performed group chat, and a controller determining whether at least one of a plurality of the counterparts becomes impossible to join the group chat (i.e., whether the at least one of a plurality of the counterparts enters a join-impossible state), the controller controlling the wireless communication unit to transmit a chat content transceived in the performed group chat after the join-impossible state to the at least one counterpart in the join-impossible state in case of the join-impossible state.

In another aspect of the present invention, a method of controlling a group chat in a mobile terminal includes the steps of performing a group chat with a plurality of counterparts, displaying a chat window of the performed group chat, if the mobile terminal is impossible to join the group chat (i.e., if the mobile terminal enters a join-impossible state) in the course of performing the group chat, receiving chat contents transceived among a plurality of the counterparts in the performed group chat after the join-impossible state, and displaying the received chat contents.

In a further aspect of the present invention, a method of controlling a group chat in a mobile terminal includes the steps of performing a group chat with a plurality of counterparts, displaying a chat window of the performed group chat, setting a transmission environment of a chat content to transmit after a state impossible to join the group chat, and if at least one of a plurality of the counterparts becomes impossible to join the group chat (i.e., if the at least one of a plurality of the counterparts enters a join-impossible state), transmitting a chat content transceived in the performed group chat after the join-impossible state to the at least one counterpart in the join-impossible state.

Accordingly, the present invention provides the following effects and/or advantages.

First of all, if a mobile terminal becomes impossible to keep joining a group chat in the course of performing the group chat, a subsequent chat content can be provided. Therefore, the mobile terminal can substantially have an effect of keeping joining the group chat from which the mobile terminal has withdrawn.

Secondly, if a specific counterpart in the course of a group chat becomes impossible to keep joining the group chat, a subsequent chat content can be provided to the specific counterpart. Therefore, a chatter having withdrawn from the group chat can substantially have an effect of keeping joining the group chat.

Finally, if a chatter becomes impossible to keep joining a group chat in the course of performing the group chat, the chatter is able to quickly rejoin a previous group chat in case that a mobile terminal enters a group chat available mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
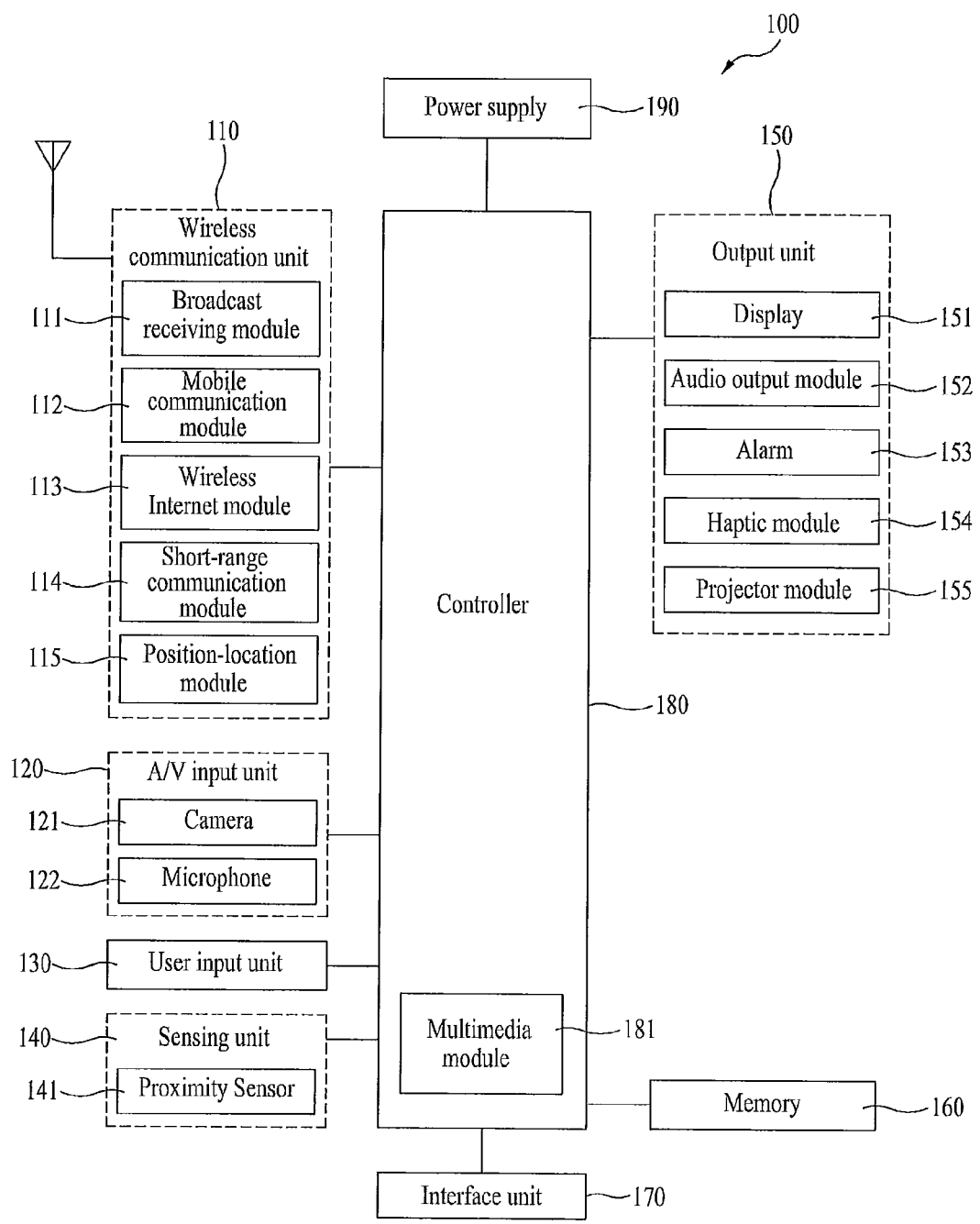
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display unit 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layered structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
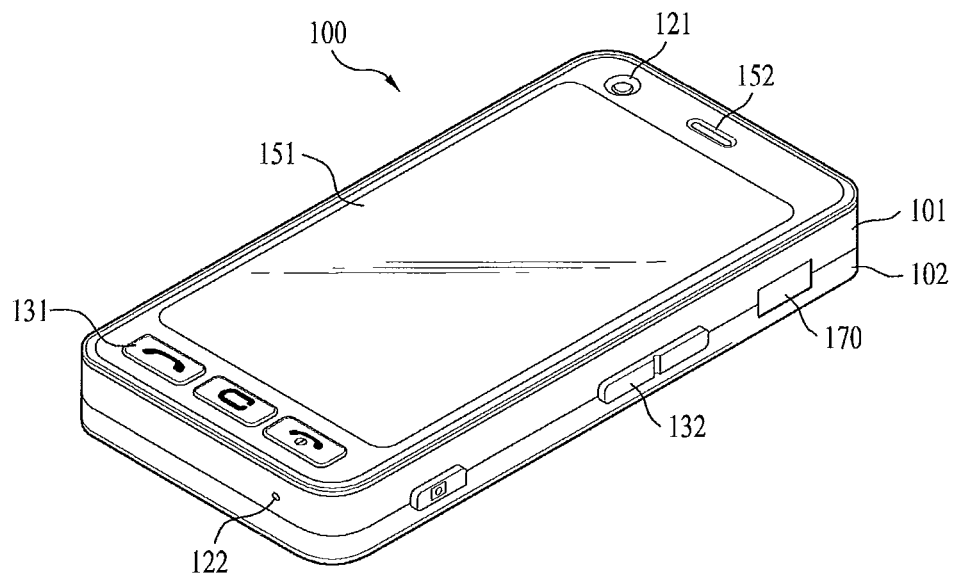
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
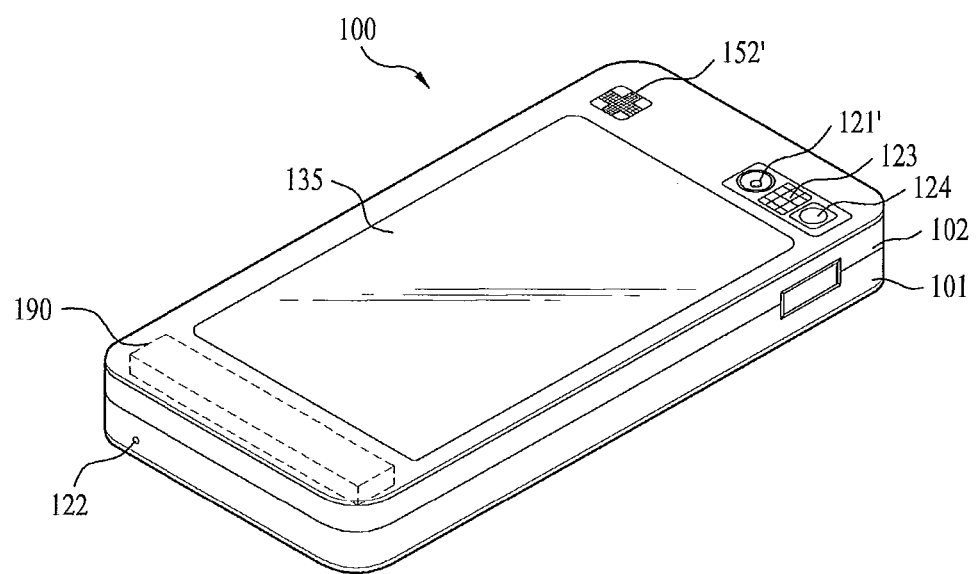
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1.

In the following description, an instant messaging service (hereinafter abbreviated IMS) means a service capable of performing such real-time data communication, which is based on an internet protocol among a plurality of terminals provided with IMS implementation functionality, as a voice chat, a video chat, a file transceiving and the like. And, the IMS can include a mobile instant messaging service that supports IMS between mobile terminals.

A group chat mentioned in this disclosure can include a chat having at least three chatters among the IMS using chats.

A group chat controlling method according to the present invention can be described by one of the two following methods in aspect of a specific chatter if the specific chatter is impossible to join a group chat in the course of performing the group chat including at least three chatters. First of all, there is a first controlling method (hereinafter named a first group chat controlling method). Secondly, there is a second controlling method (hereinafter named a second group controlling method).

In particular, in case that a specific chatter withdraws from a group chat, the first group chat controlling method relates to a controlling method in a terminal corresponding to the specific chatter withdrawing from the group chat. And, the second group chat controlling method relates to a controlling method in a terminal corresponding to a chatter remaining as a chatter of the group chat after the specific chatter has withdrawn from the group chat.

In the following description, the first group chat controlling method is explained in detail with reference to the accompanying drawing.

Figure 3:
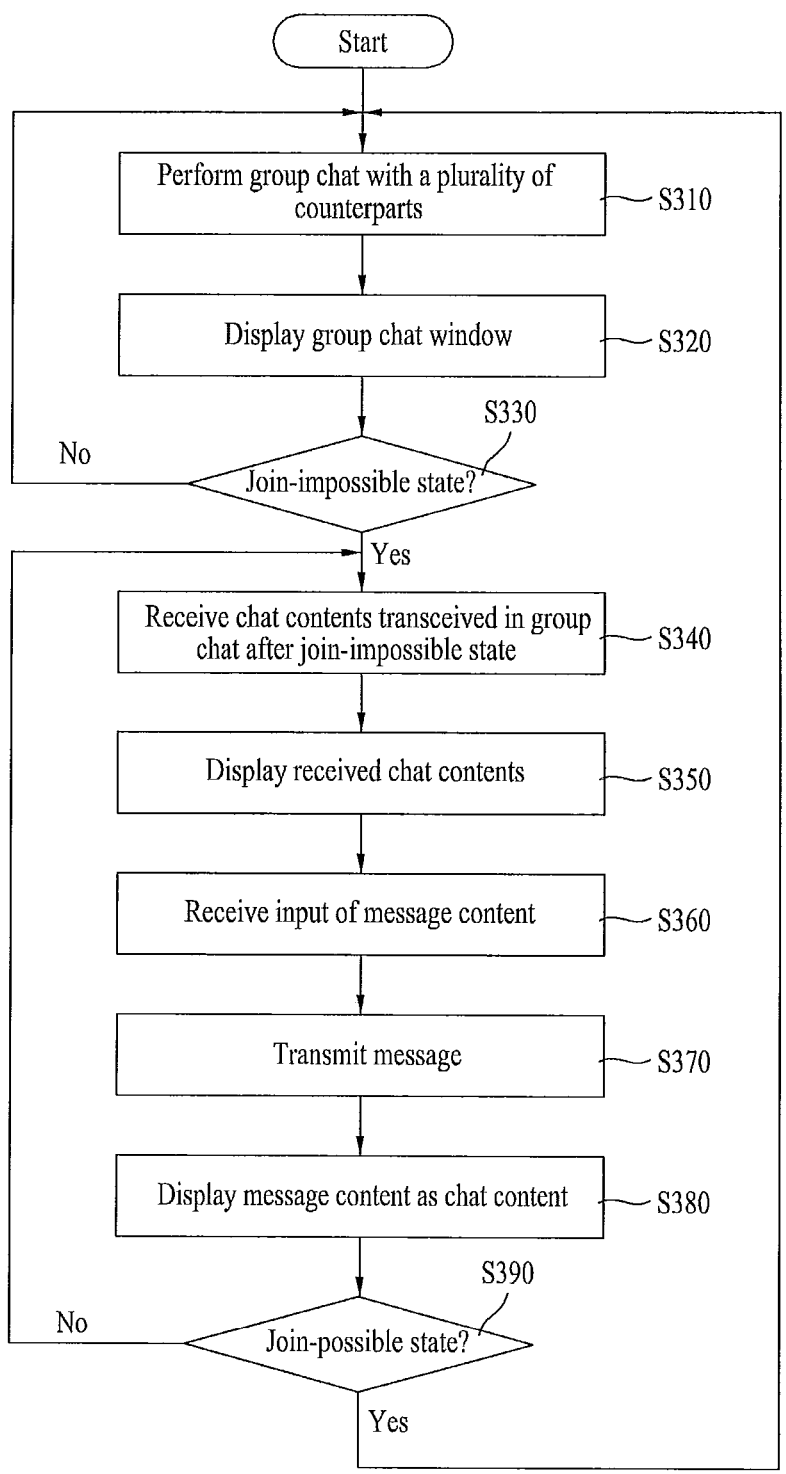
FIG. 3 is a first flowchart for a method of controlling a group chat in a mobile terminal according to one embodiment of the present invention.

FIG. 3 is a flowchart for of a first group chat controlling method according to one embodiment of the present invention.

Referring to FIG. 3, the mobile terminal 100 performs a group chat with a plurality of counterparts using the wireless communication unit 110 under the control of the controller 180 [S310]. In particular, in case that the group chat is an IMS based group chat, it is able to use the wireless internet module 113 among the components of the wireless communication unit 110.

Since chatters in the performed group chat include a plurality of the counterparts as well as the mobile terminal 100, there can exist at least three chatters in the performed group chat.

Subsequently, the mobile terminal 100 displays a chat window of the performed group chat via the display unit 151 under the control of the controller 180 [S320].

In the displayed chat window, chat contents respectively inputted by the chatters in the group chat are included. And, a chat input window for receiving an input of a chat content from a user of the mobile terminal 100 can be included in the displayed chat window as well. The chat contents included within the chat window can be enumerated in order of an input time of each of the chat contents.

The mobile terminal 100 determines whether it enters a join-impossible state, in which it is impossible to join the group chat, in the course of performing the group chat (cf. S310) under the control of the controller 180 [S330].

In this case, for example, the join-impossible state can include a logout state from a communication service (e.g., IMS) for performing the group chat, a login state at the communication service or a state of terminating the group chat. In particular, the join-impossible state can include each case that the mobile terminal 100 or a user of the mobile terminal 100 withdraws from the group chat instead of keeping joining the group chat.

Furthermore, in case of determining the join-impossible state in the determining step S330, the controller 180 is able to determine whether the determined join-impossible state is a normal join-impossible state or an abnormal join-impossible state.

In this case, the normal join-impossible state corresponds to a case that the user of the mobile terminal 100 normally withdraws from the group chat with no intention to join the group chat any further. And, the abnormal join-impossible state corresponds to a case that the user of the mobile terminal 100 is forced to withdraw from the group chat irrespective of the user's intention.

For instance, in case of receiving an input of a group chat end command (e.g., 'end' or 'close chat' is selected) or an input of a communication service end command from the user of the mobile terminal 100, the controller 180 is able to determine the normal join-impossible state. Alternatively, if a communication service is forced to end due to a poor communication service signal or an entry into a communication service unavailable area, the controller 180 is able to determine the abnormal join-impossible state. Alternatively, for every case not determined as the normal join-impossible state, the controller 180 is able to determine the abnormal join-impossible state.

In particular, while the mobile terminal 100 performs a group chat using a first communication system (e.g., Wi-Fi), if the mobile terminal 100 enters an area available not for the first communication system but for a second communication system (e.g., 3G), this case can be called an abnormal join-impossible state. In this case, the mobile terminal 100 is able to receive a subsequent chat content using the second communication system.

In case of determining the join-impossible state in the determining step S330, the mobile terminal 100 receives chat contents transceived among a plurality of the counterparts in the performed group chat via the wireless communication unit 110 after the join-impossible state under the control of the controller 180 [S340].

The performed group chat can keep being performed among the chatters (i.e., a plurality of the counterparts) except the mobile terminal 100 due to the join-impossible state of the mobile terminal 100. In particular, irrespective of the withdrawal of the mobile terminal 100, the group chat can continue to proceed.

In the receiving step S340, the mobile terminal 100 is able to receive a chat content using a data communication different from that of the communication service for performing the group chat. For instance, the different data communication can include one of a short text message service, a long text message service, a multimedia message service, an email, a short range wireless communication (e.g., Bluetooth, Zigbee, etc.), a wireless internet and the like.

In the receiving step S340, the mobile terminal 100 is able to further receive chat contents transceived in the performed group chat before the join-impossible state under the control of the controller 180.

In the receiving step S340, the mobile terminal 100 receives a chat content, which was inputted by a specific counterpart, from the specific counter or a chat content, which was inputted by the entire remaining chatters, from the specific counterpart. The latter case can be regarded as a case that the specific counterpart has a management/control authority for a group chat.

Moreover, the mobile terminal 100 can set a reception environment of chat contents, which will be received after the join-impossible state, prior to the receiving step S340 under the control of the controller 180. Furthermore, the mobile terminal 100 sets the above reception environment in the course of the receiving step S340 or is able to change a preset reception environment in the course of the receiving step S340, under the control of the controller 180.

Therefore, in the relieving step S340, the mobile terminal 100 is able to receive a chat content to correspond to the set reception environment under the control of the controller 180.

In this case, the reception environment of the chat contents can include a reception cycle of the chat content, a chatter (or a counterpart) having inputted a specific chat content to receive among the remaining chatters (or a plurality of the counterparts), a reception system of the chat contents, a display system of the chat contents, a range of the chat contents and the like.

In the following description, screen configurations for setting a reception environment of a chat content, which will be received after a join-impossible state, are explained with reference to the accompanying drawings.

Figure 4A:
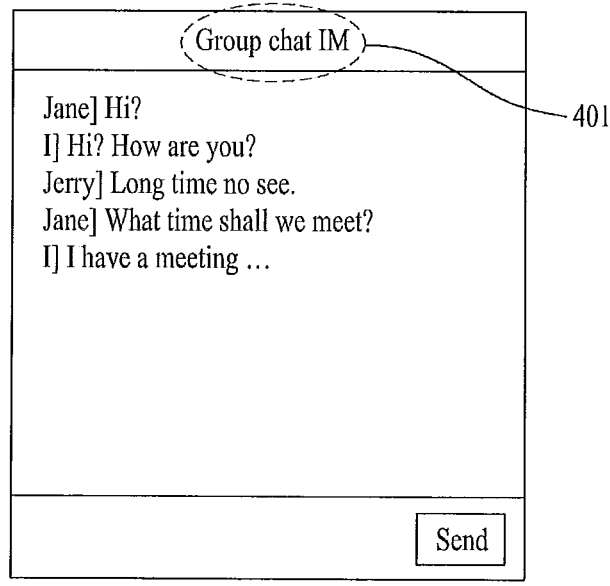
FIG. 4A and FIG. 4B are diagrams of screen configurations in case that it becomes impossible to join a group chat in progress according to the present invention.
Figure 4B:
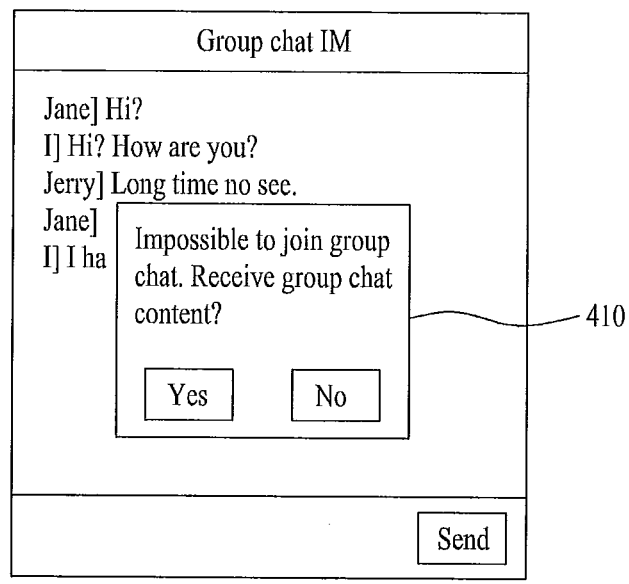

FIG. 4A and FIG. 4B are diagrams of screen configurations in case that it becomes impossible to join a group chat in progress according to the present invention.

Referring to FIG. 4A and FIG. 4B, as a group chat is performed, the mobile terminal 100 displays a group chat window [FIG. 4A]. If it becomes impossible to join the group chat in the course of performing the group chat (i.e., join-impossible state), the mobile terminal 100 is able to display a window 410 for enabling a user to select whether to receive a chat content inputted by chatters remaining after the join-impossible state [FIG. 4B].

Referring to FIG. 4B, in case of a normal join-impossible state, the mobile terminal 100 does not display the window 410. In case of an abnormal join-impossible state, the mobile terminal 100 is able to display the window 410. This means that the user does not intend to continue the group chat in case of the normal join-impossible state. Therefore, it is unnecessary to further provide a subsequent chat content to the user.

If 'Yes (receive chat contents)' is selected in FIG. 4B, the mobile terminal 100 is able to receive chat contents transceived in the group chat after the join-impossible state.

Moreover, in case of the abnormal join-impossible state, the group chat is forced to end irrespective of the user's intention. Therefore, the mobile terminal 100 is able to automatically receive the chat content irrespective of the user's selection.

In case of receiving a subsequent chat content after the join-impossible state, the controller 180 is able to set a reception environment of the chat content. In doing so, the controller 180 is able to set the reception environment to a condition selected or inputted by the user.

FIGS. 5A to 5F are diagrams of screen configurations for setting a reception environment of a group chat content to be received after it becomes impossible to join a group chat in progress according to the present invention.

Figure 5A:
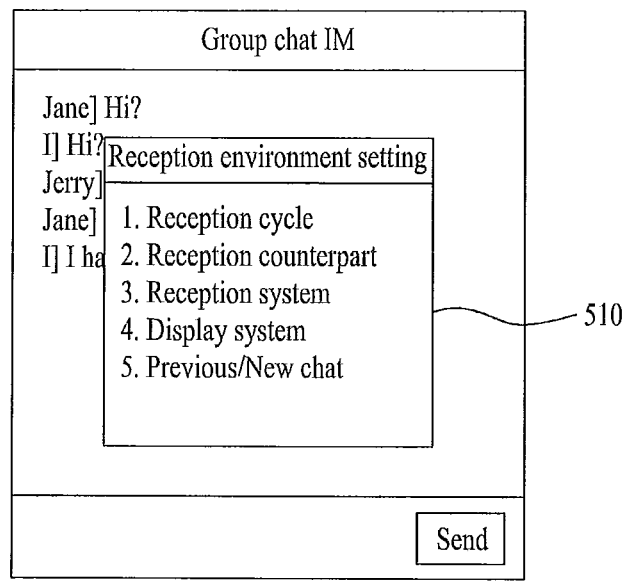
FIGS. 5A to 5F are diagrams of screen configurations for setting a reception environment of a group chat content to be received after it becomes impossible to join a group chat in progress according to the present invent

Referring to FIG. 5A, the mobile terminal 100 is able to display a list 510 including menus related to a reception environment setting of a chat content.

Figure 5B:
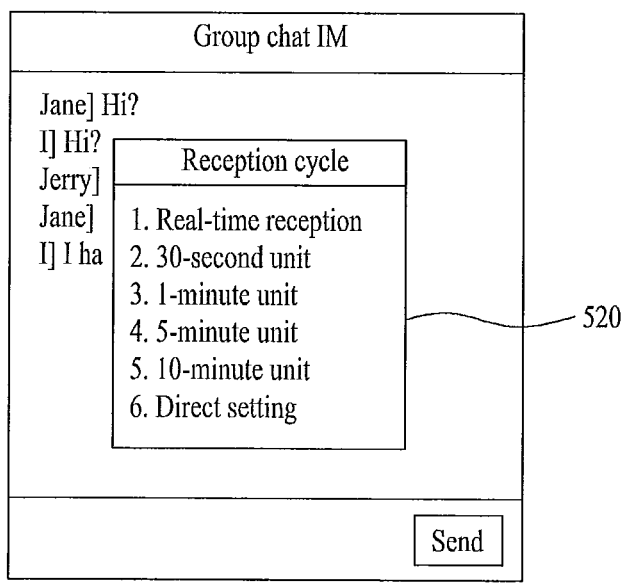

Referring to FIG. 5B, if a reception cycle is selected from the list 510, the mobile terminal 100 is able to display a reception cycle list 520 including settable reception cycles.

For instance, in case that a real-time reception is selected from the reception cycle list 520, the mobile terminal 100 is able to receive a chat content by real time. If a reception by 30-second unit is selected from the reception cycle list 520, the mobile terminal 100 is able to receive chat contents by 30-second cycle. If a direct setting is selected from the reception cycle list 520, a user is able to input a specific reception cycle in direct and the mobile terminal 100 is able to receive chat contents according to the reception cycle directly inputted by the user.

Figure 5C:
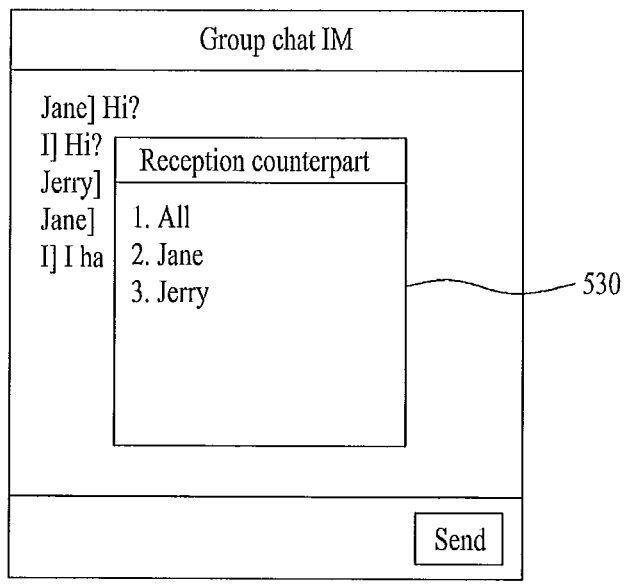

Referring to FIG. 5C, if a reception counterpart is selected from the list 510, the mobile terminal 100 is able to display a chatter list 530 including chatters remaining in a group chat.

For instance, if 'all' is selected from the chatter list 530, the mobile terminal 100 is able to receive chat contents of all chatters. If a specific chatter is selected from the chatter list 530, the mobile terminal 100 is able to receive a chat content inputted by the selected specific chatter only.

Figure 5D:
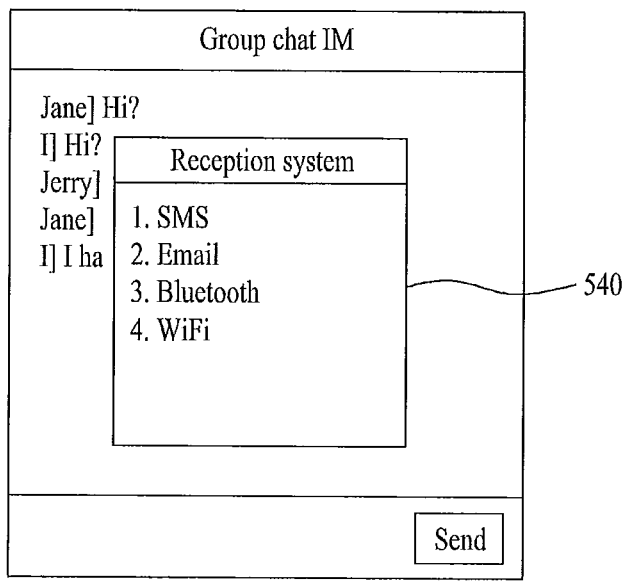

Referring to FIG. 5D, if 'reception system' is selected from the list 510, the mobile terminal 100 is able to display a reception system list 540 including systems capable of receiving chat contents.

For instance, the mobile terminal 100 is able to receive a chat content using the reception system selected from the reception system list 540.

Figure 5E:
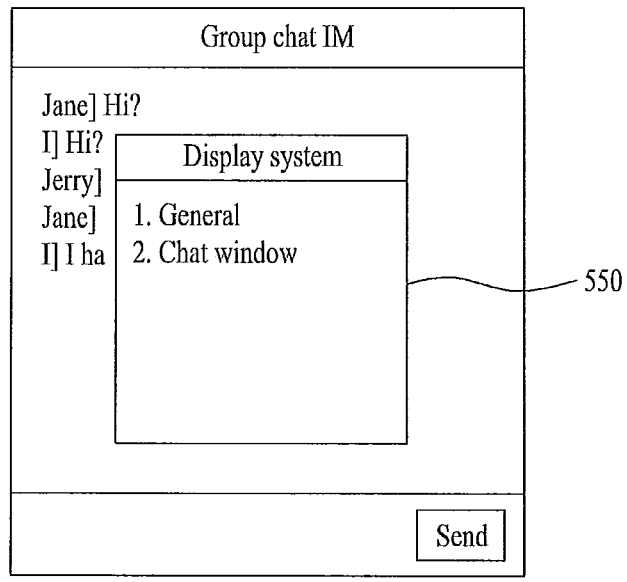

Referring to FIG. 5E, if a display system is selected from the list 510, the mobile terminal 100 is able to display a display system list 550 including chat content displayable systems.

For instance, if a general system is selected from the display system list 550, the mobile terminal 100 is able to display chat contents by a general display system corresponding to a system of receiving the chat contents. If a chat window system is selected from the display system list 550, the mobile terminal 100 is able to display chat contents by the chat window system, which will be explained in detail later.

Figure 5F:
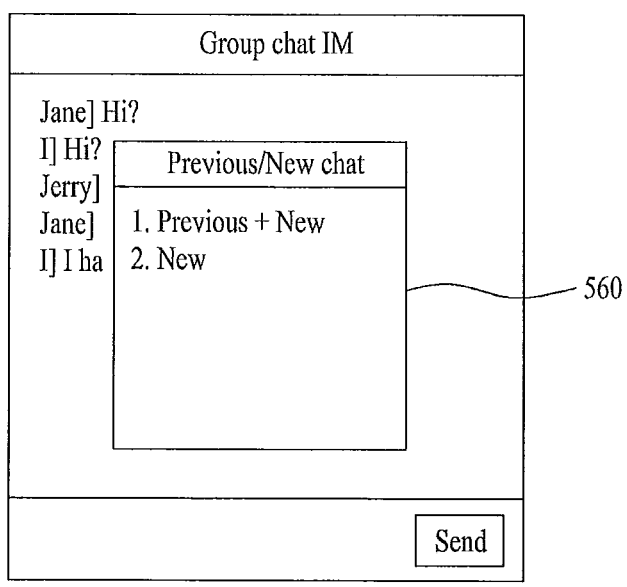

Referring to FIG. 5F, if a previous/new chat is selected from the list 510, the mobile terminal 100 is able to select a specific chat content to receive from previous chat contents and subsequent chat contents with reference to a timing point of entering the join-impossible state.

For instance, if 'previous+new' is selected, the mobile terminal 100 is able to transmit both of the previous chat contents and the subsequent chat contents. If 'new' is selected, the mobile terminal 100 is able to receive the subsequent chat contents only.

Referring now to FIG. 3, the mobile terminal 100 displays the chat content received in the receiving step S340 using the display unit 151, under the control of the controller 180 [S350].

In the displaying step S350, the mobile terminal 100 is able to display the chat contents by the display system (or the general system, cf. FIG. 5E) or the chat window system (cf. FIG. 5E) corresponding to the reception system of the chat contents.

In the following description, screen configurations for displaying chat contents by the general system are explained with reference to FIG. 6A and FIG. 6B.

For clarity and convenience of the following description, a reception system of chat contents is assumed as a text message service. And, assume that chat contents inputted by Jane and Jerry among the remaining chatters are received.

Figures 6A, 6B:
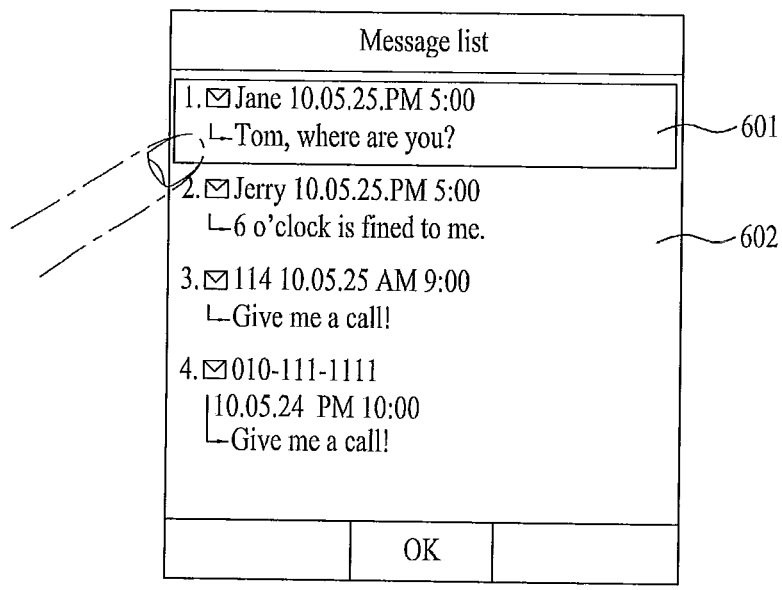
FIG. 6A and FIG. 6B are diagrams of screen configurations for displaying a group chat content, which is received after it has become impossible to join a group chat in progress, on a chat window according to the present invention.

FIG. 6A and FIG. 6B are diagrams of screen configurations for displaying a group chat content, which is received after it has become impossible to join a group chat in progress, on a chat window according to the present invention.

Referring to FIG. 6A, text messages 601 and 602, which include chat contents inputted by Jane and Jerry, respectively, can be included in a received text message list displayed on the mobile terminal 100.

Moreover, an indicator (e.g., an icon, etc.) indicating that a chat content inputted in a group chat is a message content can be included in each of the text messages 601 and 602.

Referring to FIG. 6B, if the text message 610 including the chat content inputted by Jane is selected from the received text message list, the mobile terminal 100 is able to display the chat content included in the corresponding text message 601. In doing so, the chat content can be displayed on a message content region within a received message check window.

In the following description, screen configurations for displaying chat contents by a chat window system are explained with reference to FIG. 7A and FIG. 7B. For clarity and convenience of the following description, assume that a reception system of chat contents is a text message service and assume that a communication service is IMS.

FIGS. 7A to 8B are diagrams of screen configurations for displaying a group chat content or a message content, which is received or inputted after it has become impossible to join a group chat in progress, on a chat window according to the present invention.

Figure 7A:
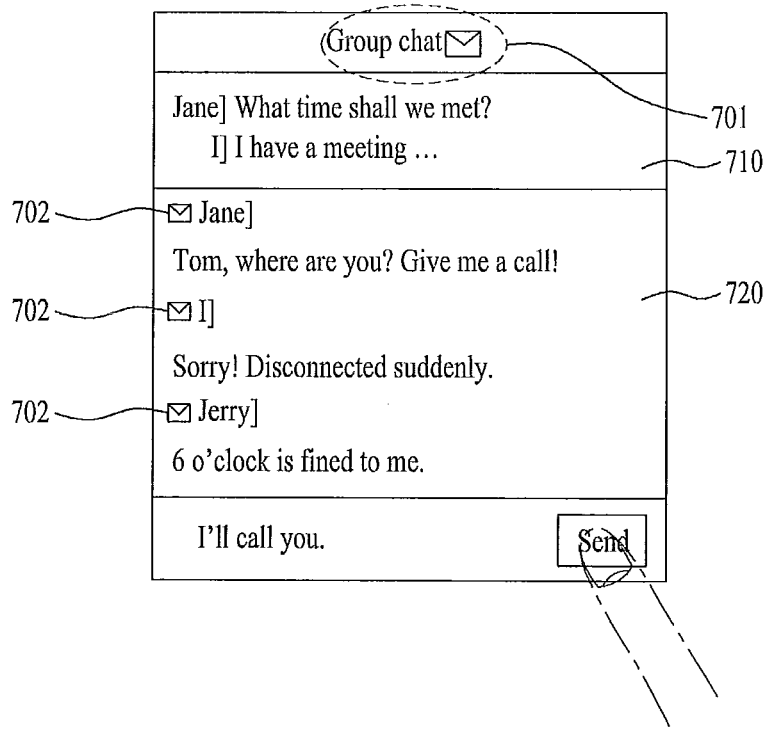
FIGS. 7A to 8B are diagrams of screen configurations for displaying a group chat content or a message content, which is received or inputted after it has become impossible to join a group chat in progress, on a chat window according to the present invention.
Figure 7B:
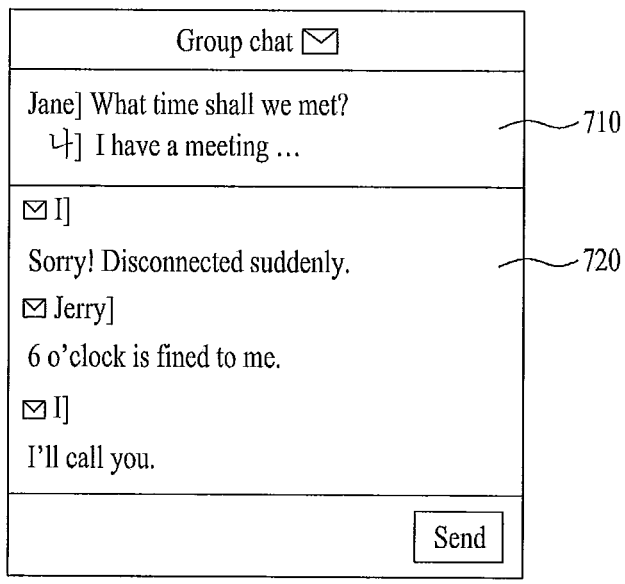

Referring to FIG. 7A and FIG. 7B, in case of entering a join-impossible state of a group chat, the mobile terminal 100 is able to switch the displayed chat window (cf. FIG. 320) from an instant message chat window to a message chat window.

Moreover, the mobile terminal 100 displays an indicator IM_401 (cf. FIG. 4A) indicating that IMS is in progress. In case of switching to the message chat window, the mobile terminal 100 is able to display an indicator 701 (cf. FIG. 7A) indicating the chat contents are being received using a text message.

Referring to FIG. 7A and FIG. 7B, the mobile terminal 100 is able to receive chat contents respectively inputted by Jane and Jerry using a text message service and is then able to display the received chat contents as chat contents within a message chat window.

In doing so, the chat contents respectively inputted by Jane and Jerry can be displayed within the message chat window together with an indicator 702 indicating that they are received using the text message service.

Referring now to FIG. 3, the mobile terminal 100 receives an input of a message content, which will be sent to the remaining chatters (e.g., a plurality of the counterparts) of the performed group chat (cf. S310), via the user input unit 130 [S360].

Of course, the system of the transmission to the remaining chatters is non-limited to the text message but can include one of a multimedia message, an email, a short-range communication and the like. The following description is just limited to the text message for example.

For instance, the mobile terminal 100 displays a general message input window and is then able to receive an input of message contents via the displayed message input window. Alternatively, in case of displaying a message chat window, the mobile terminal 100 is able to receive the message contents via a chat input window within the message chat window.

The mobile terminal 100 sends a message including the inputted message contents to the remaining chatters using the wireless communication unit 110 under the control of the controller 180 [S380].

In the following description, the message input and the chat content display using the message chat window are explained with reference to the accompanying drawings.

Figure 8A:
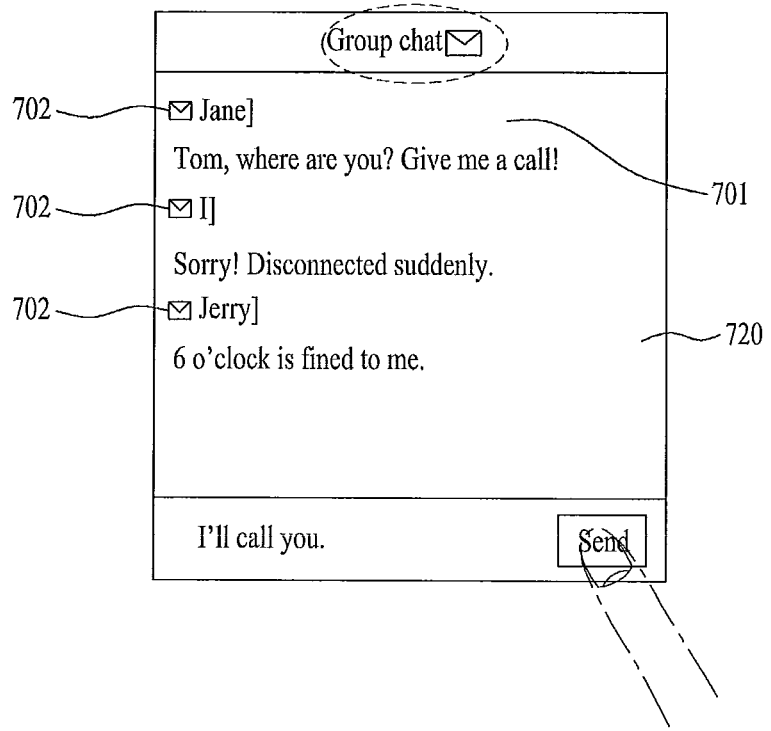
Figure 8B:
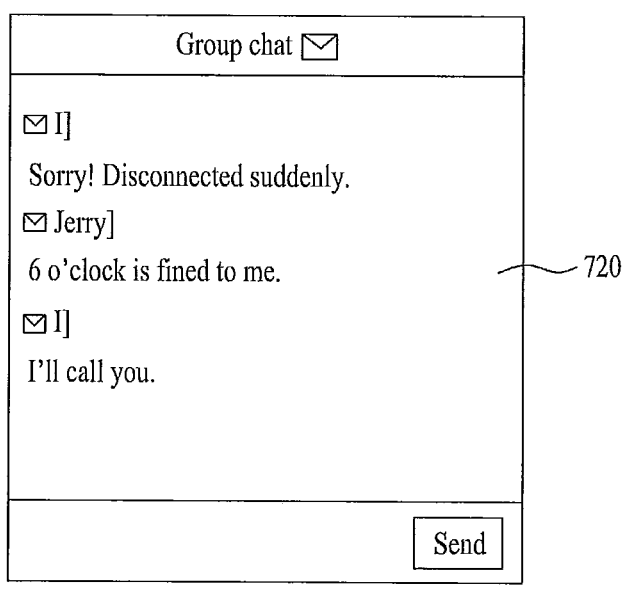

FIG. 7A and FIG. 7B are diagrams of screen configurations for displaying both previous chat contents and subsequent chat contents with reference to a timing point of entering a join-impossible state. FIG. 8A and FIG. 8B are diagrams of screen configurations for displaying subsequent chat contents only.

Referring to FIG. 7A and FIG. 7B, the mobile terminal 100 is able to distinguishably display previous chat contents and new chat contents in a manner of displaying the previous chat contents and the new chat contents in a previous chat region 710 and a new chat region 720, respectively.

In order to display the previous chat contents and the new chat contents distinguishably, the previous chat contents and the new chat contents are displayed in a manner of differing from each other in letter color or font type or differentiating chat content display regions from each other in color or pattern [not shown in the drawing].

Moreover, the mobile terminal 100 displays either the previous chat contents only or the new chat contents according to a selection made by a user.

Referring to FIG. 7A and FIG. 7B, in case of receiving a message including chat contents inputted by Jane among the remaining chatters and a message including chat contents inputted by Jerry among the remaining chatters, the chat contents included in each of the received messages can be displayed as chat contents in the message chat window.

In case of receiving an input of a message content from a user via the chat input window, the mobile terminal 100 is able to display an inputter of the displayed chat content within the message chat window using sender information (e.g., Jane or Jerry) of the corresponding message.

The chat content included in each of the messages received from Jane and Jerry is displayed as the chat content within the message chat window together with an indicator 702 indicating that the corresponding message was received using the message system.

FIG. 8A and FIG. 8B show that the new chat regions 720 shown in FIG. 7A and FIG. 7B are displayed on whole screens, respectively. And, their details are omitted from the following description.

Regarding FIGS. 7A to 8B, a reference for chat content arrangement within the message chat window is explained as follows.

First of all, a message, which was received from each remaining chatter and includes a chat content inputted by the corresponding chatter, includes time information on a time of receiving an input of a transmission command of the chat content inputted by each remaining chatter. And, a message sent from the mobile terminal 100 can include a time of receiving an input of a transmission command from a user.

Therefore, the chat contents transceived by the message system after the join-impossible state can be arranged or sorted with reference to the corresponding input time (e.g., order of early input time, etc.).

Referring now to FIG. 3, the mobile terminal 100 determines whether it becomes a join-possible state for joining the group chat performed among the remaining chatters, under the control of the controller 180 [S390].

In this case, the group chat becoming a target of the join-possible state may mean the group chat in which the mobile terminal 100 used to be a chatter was excluded from the chatters by entering the join-impossible state. In particular, the group chat is not a newly set group chat after the join-impossible state but the former group chat, in which the mobile terminal 100 was the chatter originally, continuously maintained after the join-impossible state.

In case of determining the join-possible state in the determining step S390, the mobile terminal 100 is able to re-join the performed group chat (cf. S310) under the control of the controller 180.

The rejoining is described with reference to FIGS. 9A to 9F as follows.

FIGS. 9A to 9F are diagrams of screen configurations for joining a group chat in progress if it becomes possible to join the group chat in progress according to the present invention.

Figure 9A:
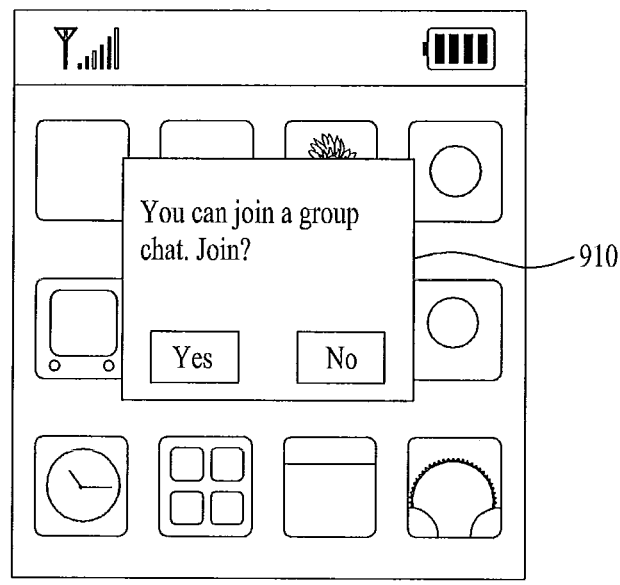
FIGS. 9A to 9F are diagrams of screen configurations for joining a group chat in progress if it becomes possible to join the group chat in progress according to the present invention.

Referring to FIG. 9A, in case of entering a state of re-joining a join-impossible group chat (hereinafter called a join-possible state), the mobile terminal 100 is able to display a window 910 for enabling a user to select whether to rejoin a group chat.

In FIGS. 9B to 9F, various embodiments in case of selecting 'yes (rejoin)' from FIG. 9A are shown.

Figure 9B:
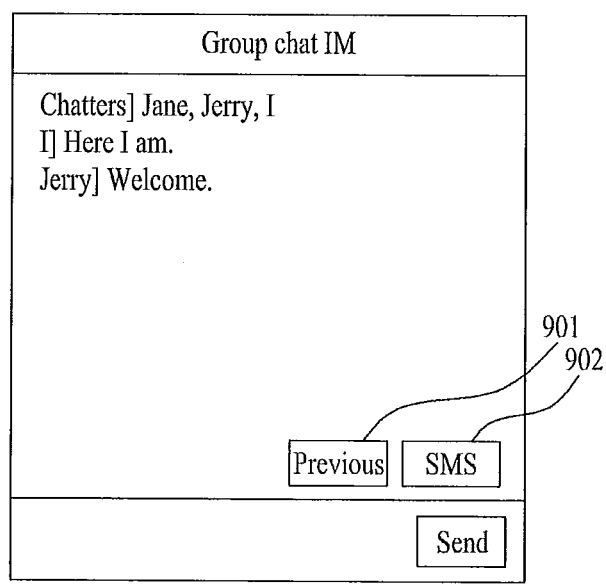

Referring to FIG. 9B, in case of rejoining the group chat, the mobile terminal 100 is able to display a group chat window including chat contents transceived between chatters (including the mobile terminal 100) from a timing point of rejoining the group chat.

Moreover, if a previous region 901 is selected in FIG. 9B, the mobile terminal 100 is able to display chat contents transceived during a period from the join-impossible state right before the join-possible state. If an SMS region 902 is selected in FIG. 9B, the mobile terminal 100 is able to display message contents of messages sent to the remaining chatters from the mobile terminal for the join-impossible state.

Figure 9C:
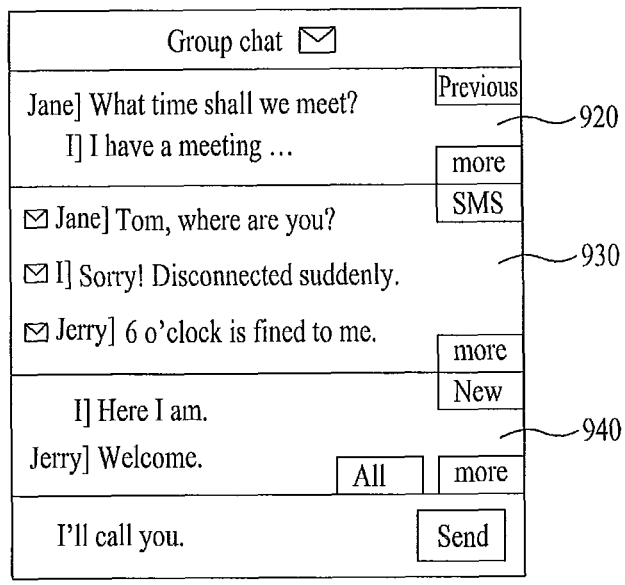

Referring to FIG. 9C, in case of rejoining the group chat, the mobile terminal 100 divides the chat window into a plurality of regions. Afterwards, the mobile terminal 100 displays previous chat contents on the first region 920, displays message contents included in the messages transceived between the mobile terminal 100 and the remaining chatters during the join-impossible state as chat contents on the second region 930, and also displays chat contents inputted from the chatters after the join-possible state on the third region 940.

Moreover, if a region 'more' is selected from the first region 920, the mobile terminal 100 is able to further display a previous chat content by extending the first region 920 (up to a whole screen). If a region 'more' is selected from the second region 930, the mobile terminal 100 is able to further display a more previous chat content by extending the second region 930 (up to a whole screen). If a region 'all' is selected from the third region 940, the mobile terminal 100 is able to display the chat window shown in FIG. 9B.

Figure 9D:
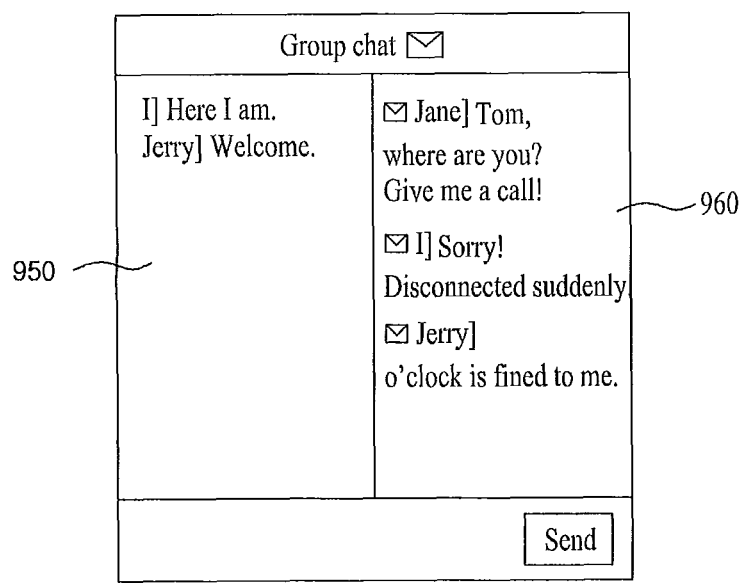

Referring to FIG. 9D, in case of rejoining the group chat, the mobile terminal 100 divides the chat window into a plurality of regions. Afterwards, the mobile terminal 100 displays chat contents inputted from the chatters after the join-possible state on the first region 950 and also displays message contents included in the messages transceived between the mobile terminal 100 and the remaining chatters during the join-impossible state on the second region 960.

Alternatively, using a popup window instead of screen division, the first region 950 is displayed on a whole screen and the second region 960 can be displayed on the popup window.

Figure 9E:
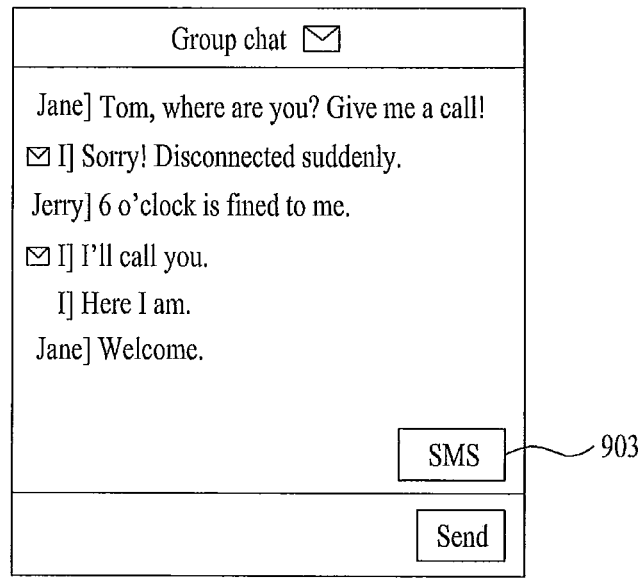
Figure 9E:
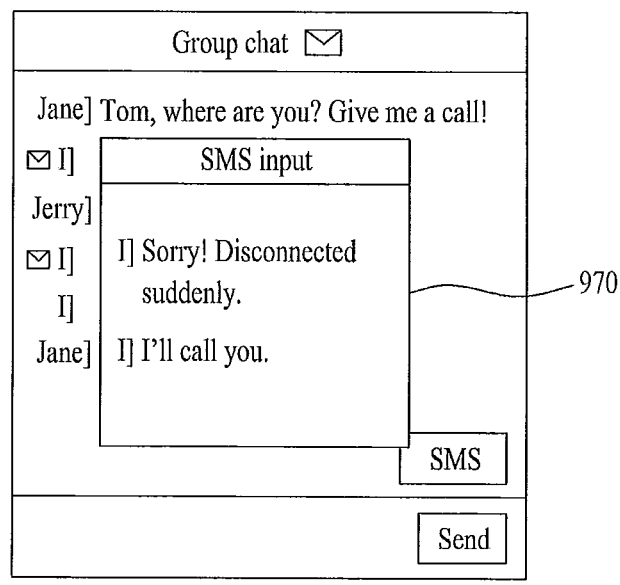

Referring to FIG. 9E, the mobile terminal 100 is able to display message contents, which are included in messages sent to the remaining chatters by the mobile terminal 100 during the join-impossible state, as chat contents within the chat window of the rejoined group chat [a].

In this case, the message content included in the corresponding message can be arranged at the corresponding location according to a content input time set to an input time of a message transmission command included in the message.

If an SMS region 903 is selected in FIG. 9E (a), the mobile terminal 100 is able to just display message contents 970 included in the messages sent to the remaining chatters from the mobile terminal 100 during the join-impossible state.

Figure 9F:
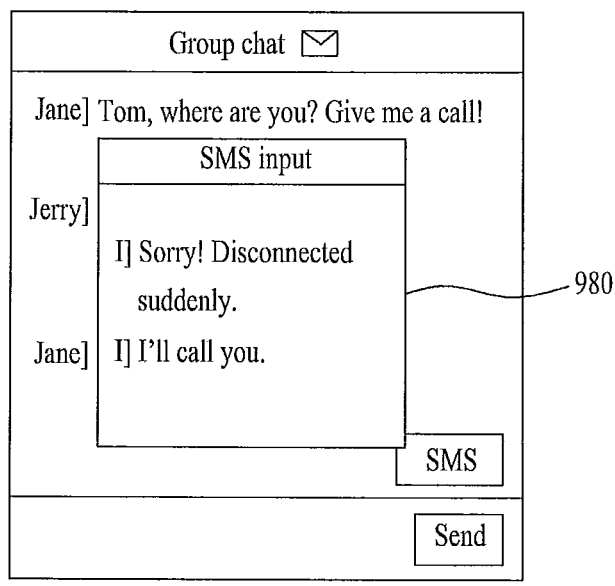

Referring to FIG. 9F, the mobile terminal 100 displays a chat window for displaying chat contents transceived since the join-possible state on a whole screen and is then able to display the message contents included in the messages transceived between the mobile terminal 100 and the remaining chatters during the join-impossible state on a popup window.

In the following description, a second group chat controlling method is explained in detail with reference to the accompanying drawings.

Figure 10:
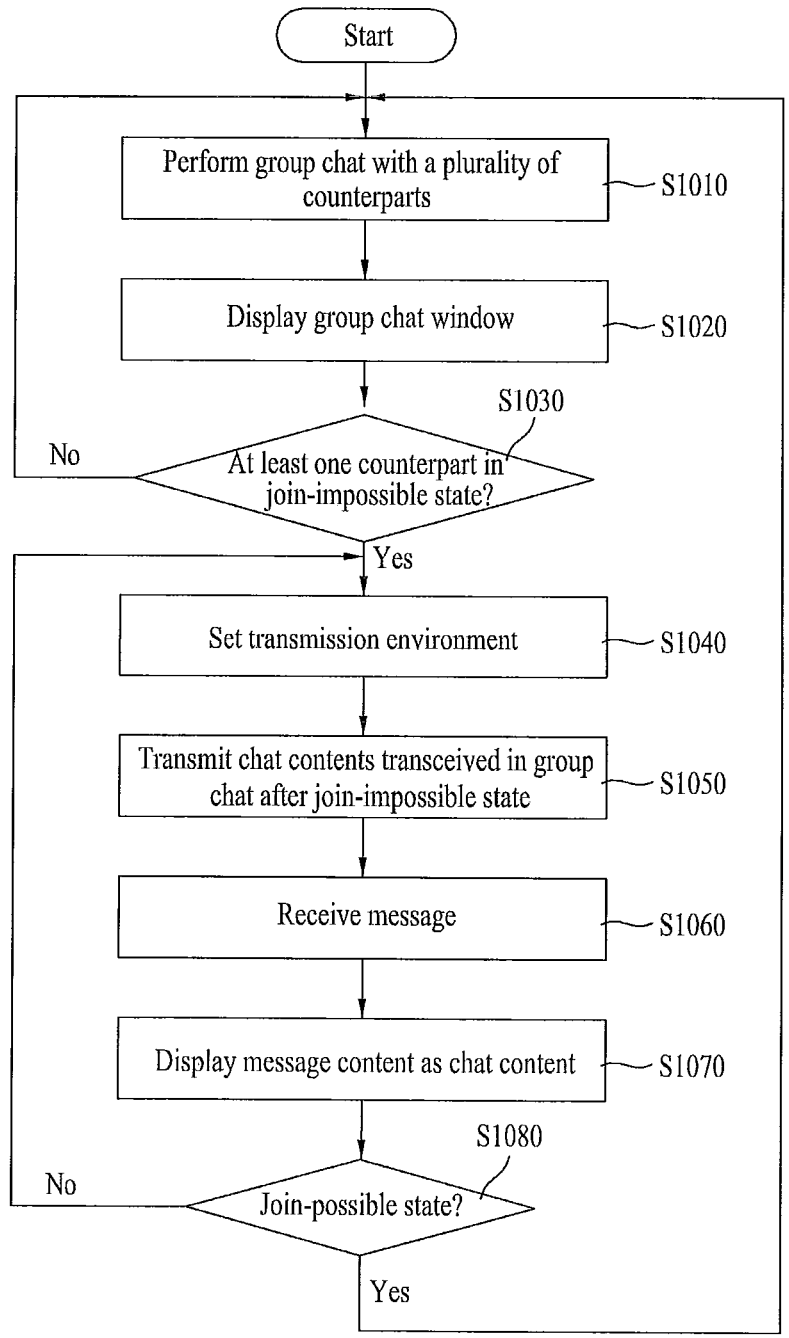
FIG. 10 is a second flowchart for a method of controlling a group chat in a mobile terminal according to one embodiment of the present invention.

FIG. 10 is a flowchart for a second group chat controlling method according to one embodiment of the present invention.

Referring to FIG. 10, the mobile terminal 100 performs a group chat with a plurality of counterparts using the wireless communication unit 110 under the control of the controller 180 [S1010].

The performing step S1010 is identical to the former performing step S310 shown in FIG. 3 and its detailed description shall be omitted from the following description.

Subsequently, the mobile terminal 100 displays a chat window of the performed group chat via the display unit 151 under the control of the controller 180 [S1020].

The displaying step S1020 is identical to the former displaying step S320 shown in FIG. 3 and its detailed description shall be omitted from the following description.

The mobile terminal 100 determines whether at least one of a plurality of counterparts (or chatters) joining the group chat is impossible to join the group chat (i.e., in a join-impossible state) in the course of performing the group chat (cf. S1010) under the control of the controller 180 [S1030].

Moreover, in case of determining the join-impossible state in the determining step S1030, the controller 180 is able to further determine whether the determined join-impossible state is a normal join-impossible state or an abnormal join-impossible state.

Description relevant to the determining step S1030 refers to the detailed description of the former determining step S330 shown in FIG. 3.

In case of determining that the at least one counterpart is in the join-impossible state in the determining step S1030, the mobile terminal 100 transmits chat contents transceived in the performed group chat after the join-impossible state to the at least one counter part in the join-impossible state (hereinafter named a join-impossible counterpart) via the wireless communication unit 100 under the control of the controller 180 [S1050].

The performed group chat can keep being performed among the rest of the chatters except the join-impossible counterpart. Namely, the group chat can keep being performed irrespective of withdrawal of the join-impossible counterpart from the group chat.

In the transmitting step S1050, the mobile terminal 100 is able to transmit the chat contents using a data communication different from a communication service for performing the group chat. For instance, the different data communication can include one of a short text message service, a long text message service, a multimedia message service, an email, a short range wireless communication (e.g., Bluetooth, Zigbee, etc.), a wireless internet and the like.

In the transmitting step S1050, the mobile terminal 100 is able to further transmit chat contents transceived in the performed group chat before the join-impossible state under the control of the controller 180.

Regarding the transmitting step S1050, the chat contents of the group chat can be transmitted to the join-impossible counterpart only if the chat contents transmission is granted by the entire remaining chatters. And, the chat content, which was inputted by the chatter having granted the chat contents transmission among the entire remaining chatters, in the whole chat contents can be transmitted only.

In the transmitting step S1050, the mobile terminal 100 transmits a chat content inputted by itself, or the chat contents inputted by the entire remaining chatters. The latter case can be regarded as a case that the mobile terminal 100 has a management/control authority for the group chat.

Moreover, the mobile terminal 100 can set a transmission environment of chat contents, which will be transmitted after the join-impossible state, prior to the transmitting step S1050 under the control of the controller 180 [S1040]. Furthermore, the mobile terminal 100 sets the above transmission environment in the course of the transmitting step S1050 or is able to change a preset transmission environment in the course of the transmitting step S1050, under the control of the controller 180.

Therefore, in the transmitting step S1050, the mobile terminal 100 is able to transmit a chat content to correspond to the set transmission environment under the control of the controller 180.

In this case, the transmission environment of the chat contents can include a reception cycle of the chat content, a chatter (or a counterpart) having inputted a specific chat content to transmit among the remaining chatters, a transmission system of the chat contents, a transmission range of the chat contents and the like.

In the following description, screen configurations for setting a transmission environment of a chat content, which will be transmitted after a join-impossible state, are explained with reference to the accompanying drawings.

Figure 11A:
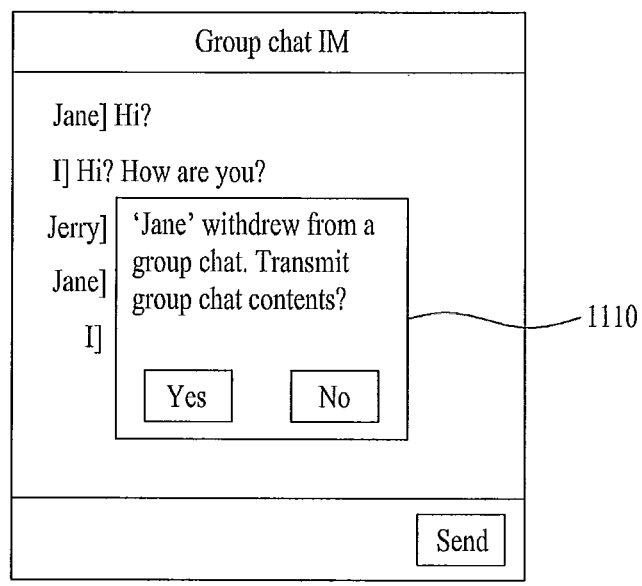
FIGS. 11A to 11C are diagrams of screen configurations if a specific counterpart becomes impossible to keep joining a group chat in progress according to the present invention.
Figure 11B:
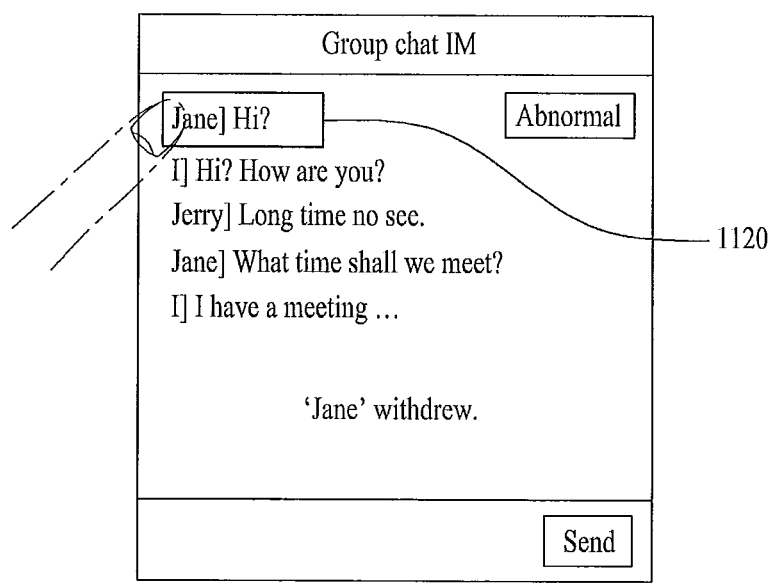
Figure 11C:
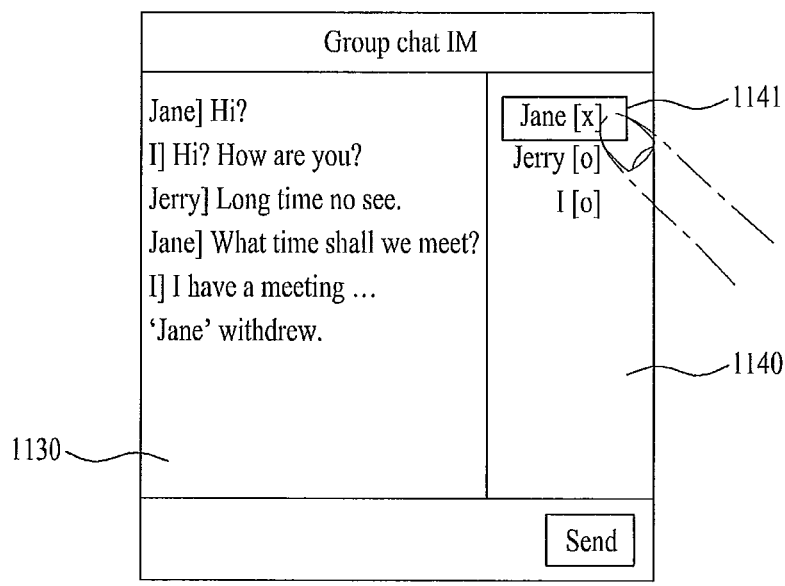

FIGS. 11A to 11C are diagrams of screen configurations if a specific counterpart becomes impossible to keep joining a group chat in progress according to the present invention.

Referring to FIG. 11A, if a specific chatter becomes impossible to join a group chat in the course of performing the group chat (i.e., join-impossible state), the mobile terminal 100 is able to display a window 1110 for enabling a user to select whether to transmit a chat content inputted after the join-impossible state to the specific chatter.

Regarding FIG. 11A, in case of a normal join-impossible state, the mobile terminal 100 does not display the window 1110. In case of an abnormal join-impossible state, the mobile terminal 100 is able to display the window 1110. This means that the user does not intend to continue the group chat in case of the normal join-impossible state. Therefore, it is unnecessary to further provide a subsequent chat content to the join-impossible counterpart.

Referring to FIG. 11B, if a specific chatter becomes impossible to join a group chat in the course of performing the group chat (i.e., join-impossible state), the mobile terminal is able to receive a selection of a name of the specific chatter displayed within the chat window or a chat content inputted by the specific chatter.

Referring to FIG. 11C, the mobile terminal 100 displays a chat window on a first region 1130 of a screen and also displays chatters performed to join the group chat on a second region 1140 of the screen, in the course of performing the group chat. Moreover, if a specific chatter enters a join-impossible state, the mobile terminal 100 is able to display an indication Jane[x] 1140, which indicates that the specific chatter is in the join-impossible state, on the second region 1140.

If 'Yes (transmit chat contents)' is selected in FIG. 11A, if the name of the join-impossible counterpart (Jane) or a chat content is selected in FIG. 11B, or if the join-impossible counterpart included in the second region 1140 is selected, the mobile terminal 100 is able to transmit chat contents transceived in the group chat after the join-impossible state to the join-impossible counterpart.

Moreover, in case of the abnormal join-impossible state, it means that the join-impossible counterpart is forced to withdraw from the group chat irrespective of the join-impossible counterpart's intention. Therefore, the mobile terminal 100 is able to automatically transmit the chat contents irrespective of the user's selection.

In case of transmitting a subsequent chat content after the join-impossible state, the controller 180 is able to set a transmission environment of the chat content. In doing so, the controller 180 is able to set the transmission environment to a condition selected or inputted by the user.

FIGS. 12A to 12E are diagrams of screen configurations for setting a transmission environment of a group chat content to transmit after it becomes impossible to join a group chat according to the present invention.

Figure 12A:
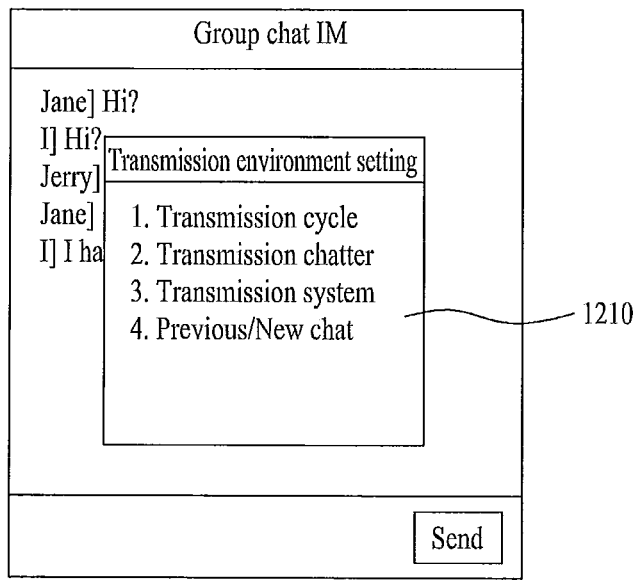
FIGS. 12A to 12E are diagrams of screen configurations for setting a transmission environment of a group chat content to transmit after it becomes impossible to join a group chat according to the present invention.

Referring to FIG. 12A, the mobile terminal 100 is able to display a list 1210 including menus related to a transmission environment setting of a chat content.

Figure 12B:
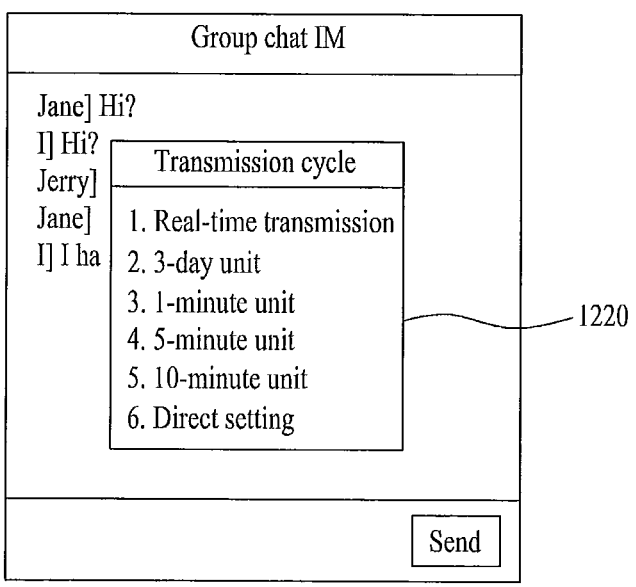

Referring to FIG. 12B, if a transmission cycle is selected from the list 1210, the mobile terminal 100 is able to display a transmission cycle list 1220 including settable transmission cycles.

For instance, in case that a real-time transmission is selected from the transmission cycle list 1220, the mobile terminal 100 is able to transmit a chat content by real time. If a transmission by 30-second unit is selected from the transmission cycle list 1220, the mobile terminal 100 is able to transmit chat contents by 30-second cycle.

Figure 12C:
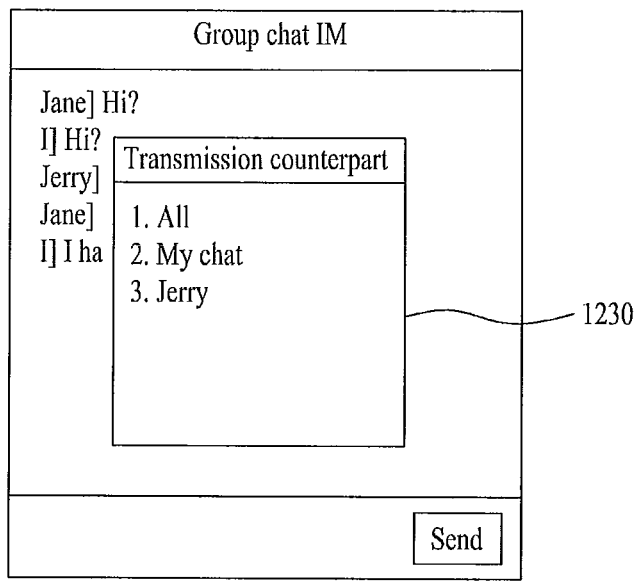

Referring to FIG. 12C, if a transmission counterpart is selected from the list 1210, the mobile terminal 100 is able to display a chatter list 1230 including chatters remaining in a group chat.

For instance, if 'all' is selected from the chatter list 1230, the mobile terminal 100 is able to transmit chat contents of all chatters. If a specific chatter is selected from the chatter list 1230, the mobile terminal 100 is able to transmit a chat content inputted by the selected specific chatter only.

Figure 12D:
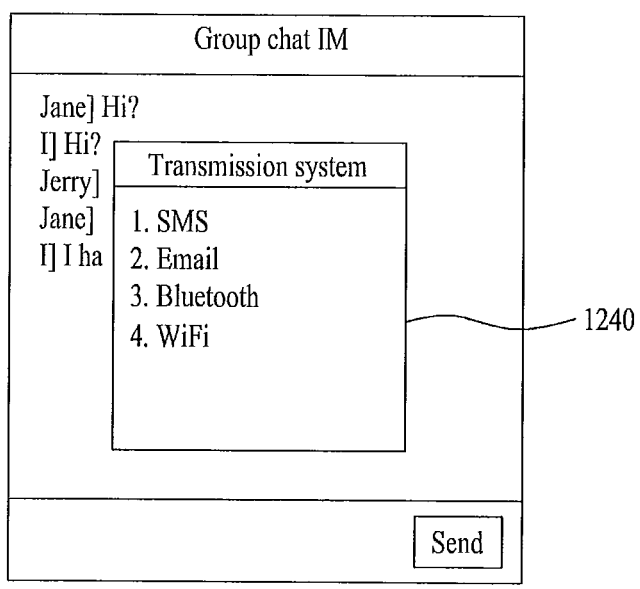

Referring to FIG. 12D, if 'transmission system' is selected from the list 1210, the mobile terminal 100 is able to display a transmission system list 1240 including systems capable of transmitting chat contents.

For instance, the mobile terminal 100 is able to transmit a chat content using the transmission system selected from the transmission system list 1240.

Figure 12E:
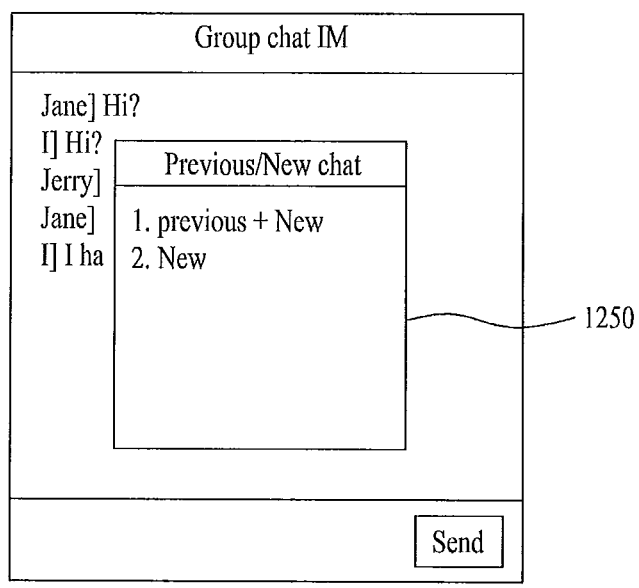

Referring to FIG. 12E, if a previous/new chat is selected from the list 1210, the mobile terminal 100 is able to select a specific chat content to transmit from previous chat contents and subsequent chat contents with reference to a timing point of entering the join-impossible state.

For instance, if 'previous+new' is selected, the mobile terminal 100 is able to transmit both of the previous chat contents and the subsequent chat contents. If 'new' is selected, the mobile terminal 100 is able to transmit the subsequent chat contents only.

Moreover, in case of transmitting a chat content after the join-impossible state, the mobile terminal 100 enables a user to directly select a chat content to transmit using a chat window including chat contents.

Figure 13A:
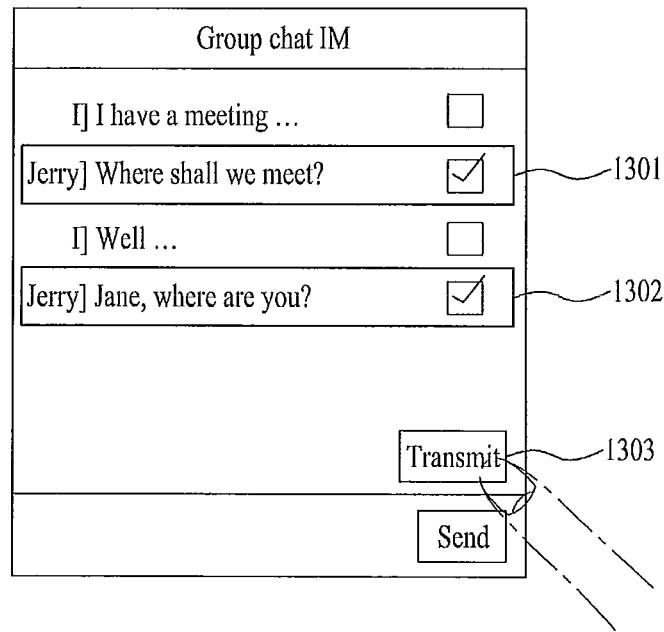
FIG. 13A and FIG. 13B are diagrams of screen configurations for selecting a chat content to transmit from chat contents displayed on a group chat window after a specific counterpart has become impossible to join a group chat according to the present invention.
Figure 13B:
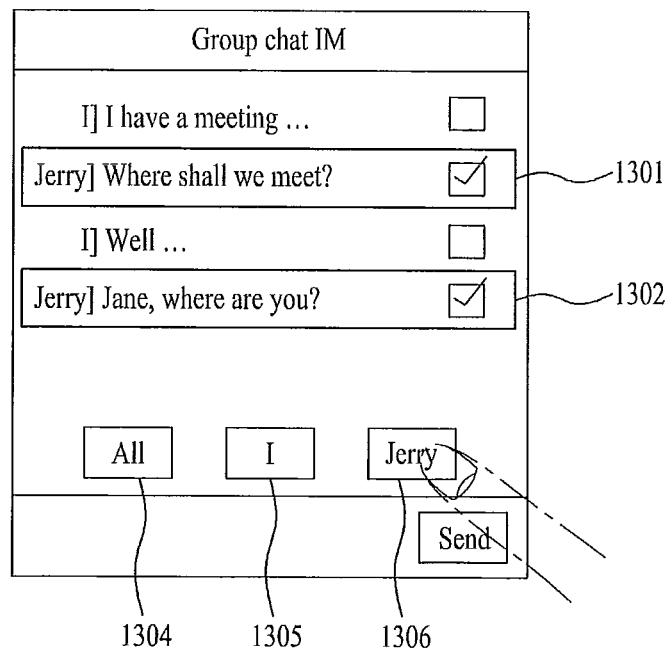

FIG. 13A and FIG. 13B are diagrams of screen configurations for selecting a chat content to transmit from chat contents displayed on a group chat window after a specific counterpart has become impossible to join a group chat according to the present invention.

Referring to FIG. 13A, after a user has selected first and second chat contents 1301 and 1302 from a plurality of chat contents, if a transmit region 1303 is activated, the mobile terminal 100 is able to transmit the selected first and second chat contents 1301 and 1302 to a join-impossible counterpart.

Alternatively, referring to FIG. 13B, the mobile terminal 100 is able to transmit a chat content inputted by a chatter corresponding to a selected one of remaining chatter regions 1304 to 1306 to the join-impossible counterpart.

For instance, if a region 'all' 1304 is selected from the remaining chatter regions, the mobile terminal is able to all of the chat contents inputted by all of the remaining chatters to the join-impossible counterpart. If a region 'I' 1305 is selected from the remaining chatter regions, the mobile terminal 100 is able to transmit a chat content inputted by itself to the join-impossible counterpart. If a region 'Jerry' 1306 is selected from the remaining chatter regions, the mobile terminal 100 is able to transmit a chat content inputted by Jerry to the join-impossible counterpart.

In this case, a transmission subject of the chat content can include a chatter having inputted a corresponding chat content (or a chatter terminal) or a terminal having management/control authority of the group chat.

The mobile terminal is able to display an indication, which indicates whether the join-impossible counterpart is in a normal join-impossible state or an abnormal join-impossible state, on a chat window.

Figure 14A:
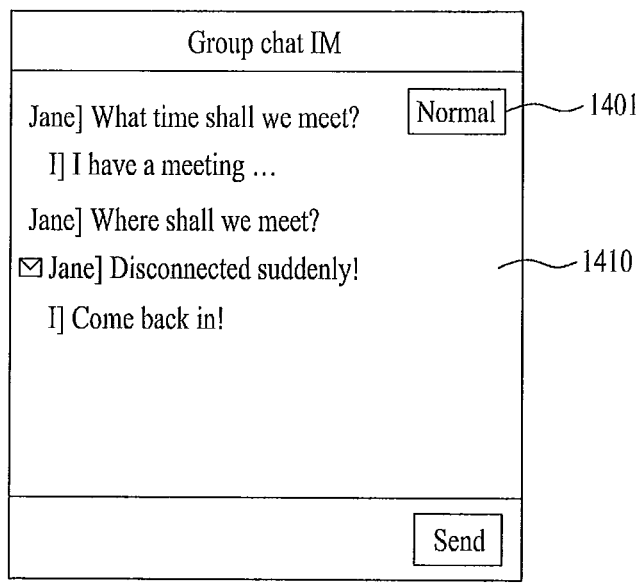
FIG. 14A and FIG. 14B are diagrams of screen configurations for displaying a message, which is received from a specific counterpart having become impossible to join a group chat, as a chat content according to the present invention.

For instance, if a join-impossible counterpart 'Jane' is in a normal join-impossible state, the mobile terminal 100 displays an indicator 'Normal' 1401 indicating the state of the join-impossible counterpart together with a chat content (particularly, a chat content inputted latest) inputted by Jane through a group chat [cf. FIG. 14A]. If the join-impossible counterpart is in an abnormal join-impossible state, the mobile terminal 100 is able to display an indicator 'Abnormal' 1402 indicating the state of the join-impossible counterpart [cf. FIG. 14B].

Meanwhile, in case that a region 1140 (cf. FIG. 11C) for indicating a chatter is separately provided, it is able to display a normal/abnormal join-impossible state of Jane 1141 in the chatter display region 1140.

Referring now to FIG. 10, the mobile terminal 100 receives a message from the join-impossible counterpart via the wireless communication unit 110 [S1060].

Subsequently, the mobile terminal 100 displays a message content included in the received message as a chat content on the chat window (cf. S1020) [S1070].

Of course, the reception system from the join-impossible counterpart can include one of various systems including a text message service, a multimedia service, an email, a short-range communication and the like. Yet, the communication service for performing the group chat is excluded.

This is explained in detail with reference to FIG. 14A and FIG. 14B as follows.

Figure 14B:
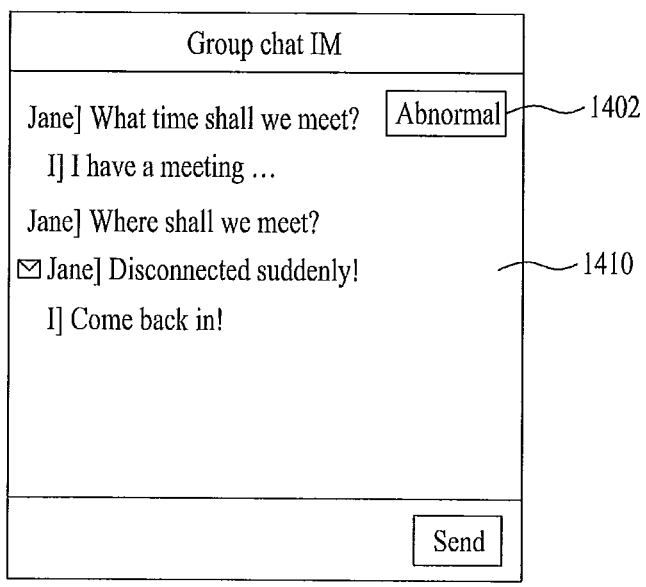

FIG. 14A and FIG. 14B are diagrams of screen configurations for displaying a message, which is received from a specific counterpart having become impossible to join a group chat, as a chat content according to the present invention.

Referring to FIG. 14A and FIG. 14B, in case of receiving a join-impossible counterpart 'Jane', a message content 1410 included in the received message can be displayed as a chat content on a chat window.

In doing so, it is able to display an inputter of the chat content (i.e., it corresponds to the message content) displayed on the chat window using sender information (Jane) of the message.

And, the chat content 1410 corresponding to the message received from Jane can be displayed together with an indicator indicating that it is received by a message system.

In case of receiving a message from a join-impossible counterpart, an arrangement reference for chat contents including a chat content corresponding to a message content is explained as follows.

First of all, a message, which was received from a join-impossible counterpart, can include time information on a time of receiving an input of a message transmission command from the join-impossible counterpart. Therefore, the chat content corresponding to the received message can be arranged or sorted at the corresponding position by regarding the input time of the message transmission command as the chat content input time (e.g., in order of early input time, etc.).

Referring now to FIG. 10, the mobile terminal 100 determines whether the join-impossible counterpart becomes a join-possible state for joining the performed group chat (cf. S1010), under the control of the controller 180 [S1080].

In this case, the group chat becoming a target of the join-possible state may mean the group chat in which the join-impossible counterpart used to be a chatter was excluded from the chatters by entering the join-impossible state. In particular, the group chat is not a newly set group chat after the join-impossible state but the former group chat, in which the join-impossible counterpart was the chatter originally, continuously maintained since the join-impossible state.

In case of determining the join-possible state in the determining step S1080, the mobile terminal 100 enables the join-impossible counterpart to rejoin the performed group chat (cf. S1010) under the control of the controller 180.

In doing so, whether the join-impossible counterpart rejoins the group chat is determined by the join-impossible counterpart or can be determined by the remaining chatters or the chatter having management/control authority on the group chat.

In case that the join-impossible counterpart rejoins the group chat, the corresponding details refer to the former description with reference to FIGS. 9A to 9F. Yet, in referring to the description with reference to FIGS. 9A to 9F, it should be considered that the join-impossible counterpart is not the mobile terminal 100 but a specific one of a plurality of counterparts.

According to the present invention, in case that a plurality of chatters become join-impossible counterparts in a group chat including at least 4 chatters, the mobile terminal 100 is able to select whether to transmit a chat content after a join-impossible state to each of a plurality of the join-impossible counterparts. This is explained in detail with reference to FIGS. 15A to 16B as follows.

FIGS. 15A to 16B are diagrams of screen configurations for selecting a counterpart, to which a group chat content will be sent, if a plurality of counterparts become impossible to join a group chat according to the present invention.

Figure 15A:
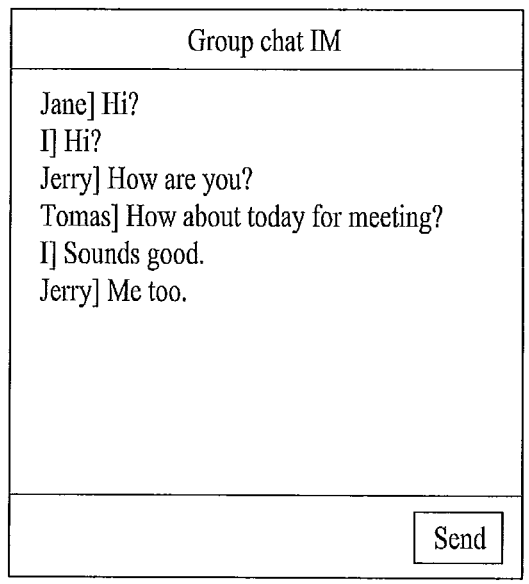
FIGS. 15A to 16B are diagrams of screen configurations for selecting a counterpart, to which a group chat content will be sent, if a plurality of counterparts become impossible to join a group chat according to the present invention.
Figure 15B:
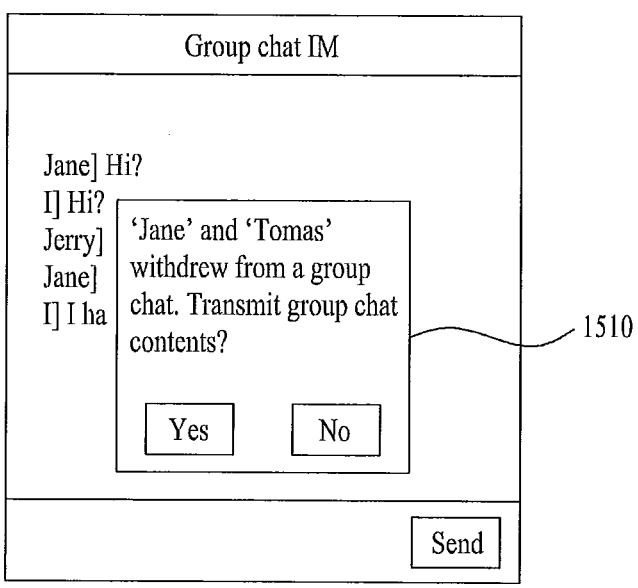
Figure 15C:
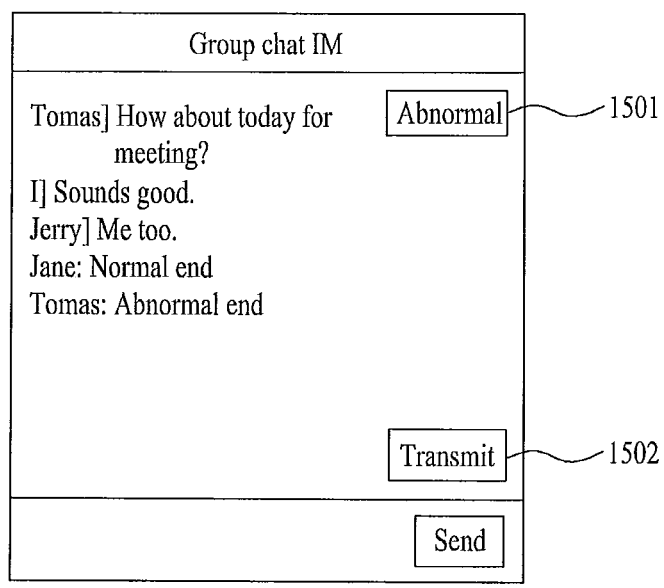

Referring to FIGS. 15A to 15C, if 2 chatters enter a join-impossible state in the course of performing a group chat including 4 chatters [FIG. 15A], the mobile terminal 100 displays a window for enabling a user to select whether to transmit a chat content after the join-impossible state to the 2 join-impossible counterparts [FIG. 15B] or is able to display that the 2 chatters withdraw from the group chat due to the join-impossible state and whether the join-impossible state is a normal join-impossible state (i.e., normal end) or an abnormal join-impossible state (i.e., abnormal end).

Figure 16A:
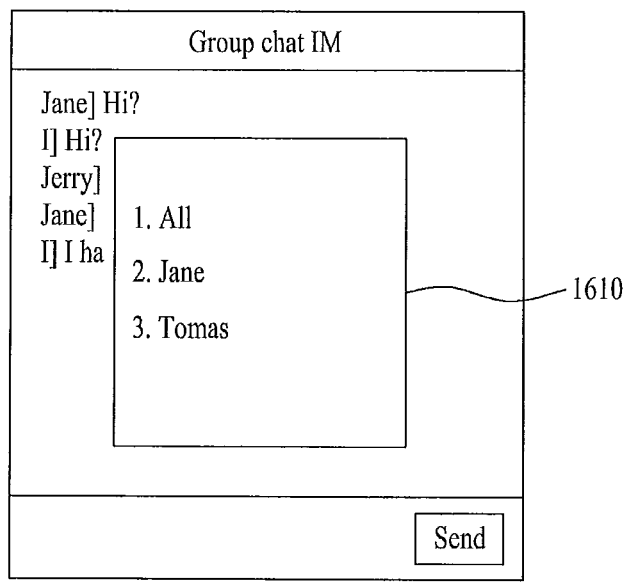
Figure 16B:
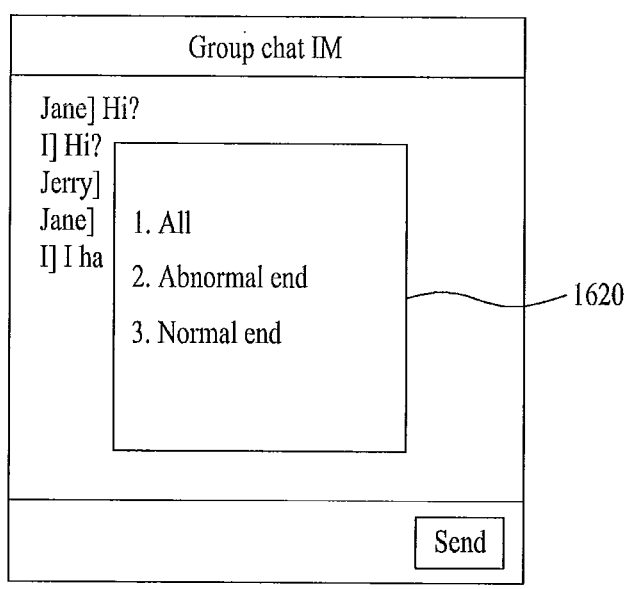

If 'yes (transmit)' is selected in FIG. 15B or 'transmit' 1502 is selected in FIG. 15C, the mobile terminal 100 displays a join-impossible chatter list 610 [FIG. 16A] or a list 1620 of join-impossible types (i.e., normal and abnormal) of the join-impossible chatter [FIG. 16B].

In the following description, assume that the join-impossible chatters include Jane and Tomas.

Referring to FIG. 16A, if 'all' is selected from the join-impossible chatter list 1610, the mobile terminal 100 is able to transmit a chat content to all of the join-impossible chatters. If Jane is selected, the mobile terminal 100 is able to transmit the chat content to Jane only. If Tomas is selected, the mobile terminal 100 is able to transmit the chat content to Tomas only.

Referring to FIG. 16B, if 'all' is selected from the join-impossible type list 1620, the mobile terminal 100 is able to transmit a chat content to all of the join-impossible chatters. If the abnormal end is selected, the mobile terminal 100 is able to transmit the chat content to Tomas in the abnormal join-impossible state only. If the normal end is selected, the mobile terminal 100 is able to transmit the chat content to Jane in the normal join-impossible state only.

Besides, it is able to set a transmission environment of a chat content for each of a plurality of join-impossible chatters (not shown in the drawings) [cf. FIGS. 12A to 12E].

In this disclosure, in case that a chat content of a group chat is transmitted using a communication system different from a communication service for performing the group chat, a transmission subject terminal is limited to a terminal in a join-impossible state, which used to be an original chatter of the group chat. Yet, the present invention is applicable to all terminals registered with the communication service.

In this disclosure, a chat content of a group chat is limited to a text, by which the present invention is non-limited. And, the chat content can include such data of all types transceived among chatters in the group chat as an image, an icon, an emoticon, a file and the like.

According to one embodiment of the present invention, the above-described group chat controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to perform a group chat with a plurality of counterparts;
   a display configured to display multiple chat windows of the performed group chat, the multiple chat windows including an upper instant message chat window and a lower non-instant message chat window,
   the lower non-instant message chat window including a text message chat window, an email chat window, or a short range wireless communication chat window; and a processor configured to: before the group chat is terminated in response to an intentional withdrawal from the group chat, or before the wireless communication unit is terminated from a first communication network and is newly connected to a second communication network, receive via the first communication network a first message including chat contents transmitted by at least one of the plurality of counterparts in the group chat, and control the display to display the chat contents of the received first message in the upper instant message chat window only,
   determine whether the group chat is terminated in response to the intentional withdrawal from the group chat, or whether the wireless communication unit is terminated from the first communication network and is newly connected to the second communication network,
   when the wireless communication unit is terminated from the first communication network and is newly connected to the second communication network, control the display to display an inquiry message for disconnecting from the group chat, and when an input is received via the inquiry message to disconnect from the group chat, control the wireless communication unit to not transmit any chat contents of any messages, and after the wireless communication unit is terminated from the first communication network and is newly connected to the second communication network, and an input is received via the inquiry message to not disconnect from the group chat, receive via the second communication network an unrequested second message including chat contents transmitted by the at least one counterpart in the performed group chat and control the display to display the chat contents of the received second message in the lower non-instant message chat window only.

2. The mobile terminal of claim 1, wherein the display distinguishably displays the chat contents of the second message, after the wireless communication unit is terminated from the first communication network and is newly connected to the second communication network.

3. The mobile terminal of claim 1, wherein the processor sets a reception environment of the chat contents of the second message to receive, after the wireless communication unit is terminated from the first communication network and is newly connected to the second communication network, and wherein the wireless communication unit receives the chat contents of the second message to correspond to the set reception environment under control of the processor.

4. The mobile terminal of claim 1, wherein the wireless communication unit receives the chat contents of the second message to correspond to a transmission environment set by each of the plurality of counterparts in association with the chat contents of the second message to receive, after the wireless communication unit is terminated from the first communication network and is newly connected to the second communication network.

5. The mobile terminal of claim 1, wherein,
when the wireless communication unit is reconnected to the first communication network, the processor is further configured to:
receive via the first communication network a third message including chat contents transmitted by the at least one counterpart,
transmit a fourth message including input message content to the plurality of counterparts, and control the display to display the input message content included in the fourth message within the multiple chat windows.

6. The mobile terminal of claim 1, wherein,
when the wireless communication unit is reconnected to the first communication network, the wireless communication unit rejoins the performed group chat via the first communication network, under control of the processor and the display displays the multiple chat windows of the rejoined group chat under the control of the processor.

7. The mobile terminal of claim 6, wherein after the wireless communication unit is reconnected to the first communication network, the wireless communication unit receives via the first communication network a third message including chat contents transmitted by the at least one counterpart, and
wherein the multiple chat windows of the rejoined group chat include the chat contents of the third message transmitted by the at least one counterpart.

8. The mobile terminal of claim 7, wherein after the wireless communication unit is reconnected to the first communication network, a transmission time of the third message is enumerated with reference to an input time of the third message.

9. The mobile terminal of claim 7, wherein,
when the wireless communication unit is reconnected to the first communication network, the processor is further configured to:
transmit a fourth message including input message content to the plurality of counterparts, set a transmission environment of the input message content of the fourth message to transmit after the wireless communication unit is reconnected to the first communication network, and transmit the input message content of the fourth message to correspond to the set transmission environment under control of the processor.

10. The mobile terminal of claim 9, wherein if a transmission of the fourth message is granted by a remaining chatter of the group chat, the wireless communication unit transmits the input message content of the fourth message after the wireless communication unit is reconnected to the first communication network.

11. The mobile terminal of claim 9, wherein the wireless communication unit transmits the input message content of the fourth message to remaining chatters of the group chat under control of the processor after the wireless communication unit is reconnected to the first communication network.

12. The mobile terminal of claim 9, wherein the wireless communication unit transmits the input message content of the fourth message to chatters remaining in the group chat by real time or with a predetermined time interval under control of the processor after the wireless communication unit is reconnected to the first communication network.

13. The mobile terminal of claim 1, wherein the display is further configured to display a normal join-impossible state or an abnormal join- impossible state for each of the plurality of counterparts based on whether the group chat is terminated in response to the intentional withdrawal from the group chat, or whether the wireless communication unit is terminated from the first communication network and is newly connected to the second communication network, respectively.

14. A method of controlling a group chat in a mobile terminal, the method comprising:
performing a group chat with a plurality of counterparts;
displaying, via a display in the mobile terminal, multiple chat windows of the performed group chat, the multiple chat windows including an upper instant message chat window and a lower non-instant message chat window, the lower non-instant message chat window including a text message chat window, an email chat window, or a short range wireless communication chat window;
before a wireless communication unit of the mobile terminal is terminated in response to an intentional withdrawal from the group chat, or before the wireless communication unit is terminated from the first communication network and is newly connected to the second communication network, receiving via the first communication network a first message including chat contents transmitted by at least one of the plurality of counterparts in the performed group chat, and displaying, via the display, the chat contents of the received first message in the upper instant message chat window only;
determining, via a processor in the mobile terminal, whether the group chat is terminated in response to an intentional withdrawal from the group chat, or whether the wireless communication unit is terminated from the first communication network and is newly connected to the second communication network;
when the wireless communication unit is terminated from the first communication network and is newly connected to the second communication network, displaying, via the display, an inquiry message for disconnecting from the group chat, and when an input is received via the inquiry message to disconnect from the group chat, controlling the wireless communication unit to not transmit any chat contents of any messages; and after the wireless communication unit is terminated from the first communication network and is newly connected to the second communication network, contents, and an input is received via the inquiry message to not disconnect from the group chat, receiving via the second communication network an unrequested second message including chat contents transmitted by the at least one counterpart in the performed group and displaying, via the display, the chat contents of the received second message in the lower non-instant message chat window only.

16. The method of claim 14, further comprising: setting a reception environment of the chat contents of the second message to receive after the wireless communication unit is terminated from the first communication network and is newly connected to the second communication network; and
receiving the chat contents of the second message to correspond to the set reception environment.

16. The method of claim 14, further comprising: when the wireless communication unit is reconnected to the first communication network, receiving via the first communication network a
third message including chat contents transmitted by the at least one counterpart; transmitting a fourth message including input message content to the plurality of counterparts; and
displaying, via the display, the input message content of the fourth message within the multiple chat windows.

* * * * *